(12) United States Patent
Hill et al.

(10) Patent No.: US 12,498,373 B2
(45) Date of Patent: Dec. 16, 2025

(54) GLYCOPROTEIN BIOMARKERS FOR ESOPHAGEAL ADENOCARCINOMA AND BARRETT'S ESOPHAGUS AND USES THEREOF

(71) Applicant: The Council of the Queensland Institute of Medical Research, Brisbane (AU)

(72) Inventors: Michelle Mei Chih Hill, Fairfield (AU); Alok Shah, Fairfield (AU); Kim-Ahn Lê Cao, Woolloongabba (AU)

(73) Assignee: The Council of the Queensland Institute of Medical Research, Brisbane (AU)

( * ) Notice: Subject to any disclaimer, the term of this patent is extended or adjusted under 35 U.S.C. 154(b) by 468 days.

(21) Appl. No.: 17/165,803

(22) Filed: Feb. 2, 2021

(65) Prior Publication Data

US 2022/0018843 A1 Jan. 20, 2022

Related U.S. Application Data

(63) Continuation of application No. 15/527,701, filed as application No. PCT/AU2015/050723 on Nov. 17, 2015, now abandoned.

(30) Foreign Application Priority Data

Nov. 17, 2014 (AU) ................................ 2014904616

(51) Int. Cl.
*G01N 33/574* (2006.01)
*G16H 50/20* (2018.01)
*G16H 50/30* (2018.01)

(52) U.S. Cl.
CPC .. *G01N 33/57469* (2013.01); *G01N 33/57484* (2013.01); *G16H 50/20* (2018.01); *G16H 50/30* (2018.01)

(58) Field of Classification Search
CPC ....... G01N 33/57469; G01N 33/57484; G16H 50/30
See application file for complete search history.

(56) References Cited

U.S. PATENT DOCUMENTS

2019/0072557 A1  3/2019  Hill

FOREIGN PATENT DOCUMENTS

| CA | 2 405 431 A1 | 10/2001 |
| WO | WO 2007/082057 A2 | 7/2007 |
| WO | WO 2013/171489 A1 | 11/2013 |
| WO | WO 2013/192242 A2 | 12/2013 |

OTHER PUBLICATIONS

El-Akawi et al. Alpha-1 Antitrypsin Blood Levels as Indicator for the Efficacy of Cancer Treatment.. World J Oncol • 2013;4(2):83-86 . (Year: 2013).*
Comunale et al. Linkage Specific Fucosylation of Alpha-1-Antitrypsin in Liver Cirrhosis and Cancer Patients: Implications for a Biomarker of Hepatocellular Carcinoma. PLoS ONE, 2010, vol. 5, Issue 8, pp. 1-9. (Year: 2010).*
Cheng, P., et al., Gene Expression in Rats with Barrett's Esophagus and Esophageal Adenocarcinoma Induced by Gastroduodenoesophageal Reflux, World Journal of Gastroenterology, vol. 11, No. 33, pp. 5117-5122, 2005.
Choi, E., et al., High-throughput lectin magnetic bead array-coupled tandem mass spectrometry for glycoprotein biomarker discovery, Electrophoresis, vol. 32, pp. 3564-3575, 2011.
Chong, et al., Upregulation of plasma C9 protein in gastric cancer patients., Proteomics 2010, vol. 10, No. 18, pp. 3210-3221, 2010.
Gundry, R.L., et al., Investigation of an albumin-enriched fraction of human serum and its albuminome, Proteomics Clin Appl., vol. 1, No. 1, pp. 73-88, Jan. 1, 2007.
Mayampurath, A., et al., Label-Free Glycopeptide Quantification for Biomarker Discovery in Human Sera, Journal of Proteome Research, vol. 13, No. 11, pp. 4821-4832, Jun. 2014.
Mohanty, S., et al., Glycomic Expression in Esophageal Disease, Metabolites, vol. 2, pp. 1004-1011, 2012.
Patel, B.B., et al., Assessment of Two Immunodepletion Methods: Off-Target Effects and Variations in Immunodepletion Efficiency May Confound Plasma Proteomics, J Proteome Res., vol. 11, No. 12, pp. 5947-5958, Dec. 7, 2012.
Search Information Statement (SIS), dated Jan. 28, 2016, in International Application No. PCT/AU2015/050723.
Shah, A. K. et al., Discovery and validation of novel serum glycoprotein biomarkers for Barrett's esophagus and esophageal adenocarcinoma, Cancer Research, vol. 74, Issue 19 Supplement, Abstract 2492, Oct. 1, 2014.
Shah, A. K., et al., Serum glycoprotein biomarker discovery and qualification pipeline reveals novel diagnostic biomarker candidates for esophageal adenocarcinoma, Molecular & Cellular Proteomics, vol. 14, No. 11, pp. 3023-3039, Sep. 2015.
Song, E., et al., LC-MS/MS Quantitation of Esophagus Disease Blood Serum Glycoproteins by Enrichment with Hydrazide Chemistry and Lectin Affinity Chromatography, Journal of Proteome Research, vol. 13, pp. 4808-4820, Aug. 18, 2014.
Tu C., et al., Depletion of Abundant Plasma Proteins and Limitations of Plasma Proteomics, J Proteome Res., vol. 9, No. 10, pp. 4982-4991, Oct. 1, 2010.

(Continued)

*Primary Examiner* — Shafiqul Haq
(74) *Attorney, Agent, or Firm* — Suzannah K. Sundby, Esq.; Canady + Lortz LLP

(57) ABSTRACT

Disclosed are biomarkers for Barrett's esophagus and esophageal adenocarcinoma, and uses thereof, such as in methods for detecting the presence, and monitoring progression, of Barrett's esophagus and esophageal adenocarcinoma. Also disclosed are methods for treating and methods of monitoring the treatment of Barrett's esophagus and esophageal adenocarcinoma, as well as kits and compositions for use in such methods.

15 Claims, 5 Drawing Sheets

(56) References Cited

OTHER PUBLICATIONS

Vieira, I.A.M, Sintese e Optimizacao de Nanoparticulas Funcionalizadas para a Recuperacao Selectiva de Glicoproteinas em Fluidos Humanos, 2014.

International Preliminary Report on Patentability, issued May 23, 2017, in international Application No. PCT/AU2015/050723.

International Search Report, mailed Jan. 28, 2016, in International Application No. PCT/AU2015/050723.

Supplementary Tables 1-3, Song, E., et al., LC-MS/MS Quantitation of Esophagus Disease Blood Serum Glycoproteins by Enrichment with Hydrazide Chemistry and Lectin Affinity Chromatography, Journal of Proteome Research, vol. 13, pp. 4808-4820, Aug. 18, 2014.

Office Action dated Feb. 2, 2023 in Canadian Application No. 2,967,869.

Tougeron et al., Management of esophageal adenocarcinoma, Journal of Visceral Surgery, vol. 148, No. 3, pp. e161-e170, 2011.

Examination Report dated Apr. 9, 2024 for Canadian Application No. 2,967,869, in 4 pages.

\* cited by examiner

GLYCOPROTEIN BIOMARKERS FOR ESOPHAGEAL ADENOCARCINOMA AND BARRETT'S ESOPHAGUS AND USES THEREOF

RELATED APPLICATIONS

This application is a Continuation Application of U.S. application Ser. No. 15/527,701, filed May 17, 2017, which is the U.S. National Stage Application under 35 U.S.C. § 371 of International Application No. PCT/AU2015/050723, filed Nov. 17, 2015, designating the U.S. and published as WO 2016/077881 A1 on May 26, 2016, which claims priority to Australian Provisional Application No. 2014904616 entitled "Biomarkers and Uses Therefor", filed on Nov. 17, 2014. Any and all applications for which a foreign or a domestic priority is claimed is/are identified in the Application Data Sheet filed herewith and is/are hereby incorporated by reference in their entirety under 37 C.F.R. § 1.57.

FIELD OF THE INVENTION

This invention relates generally to biomarkers for Barrett's esophagus and esophageal adenocarcinoma, and uses thereof, such as in methods for detecting the presence, and monitoring progression, of Barrett's esophagus and esophageal adenocarcinoma. The invention also relates to methods for treating and methods of monitoring the treatment of Barrett's esophagus and esophageal adenocarcinoma, as well as to kits and compositions for use in such methods.

BACKGROUND OF THE INVENTION

Esophageal adenocarcinoma (EAC) is now the leading esophageal cancer in industrialized countries, with an alarming increase in incidence of 3% per year over the past 30 years. Although EAC is rare in subjects under 40 years of age, its incidence increases significantly with each decade thereafter. This is likely a result of changing lifestyle and food habits, with known EAC risk factors including, for example, accumulation of abdominal visceral fat, high dietary fat and cholesterol intake with low fruit and vegetable intake, acid reflux (gastroesophageal reflux disease), and smoking.

Barrett's esophagus (BE; also known as Barrett's metaplasia), a metaplastic change to the esophageal lining characterized by replacement of normal stratified squamous epithelium with metaplastic columnar epithelium, is a major risk factor for EAC and most EAC is thought to develop from BE. Subjects with BE have 30-125 times greater risk of developing EAC than non-BE subjects, and it is estimated that 0.5% to 1% of subjects with BE develop EAC each year (Tischoff et al. Expert Rev Gastroenterol Hepatol 2008; 2:653-63). BE develops relatively slowly, generally over 5 to 10 years. This development is thought to be in response to chronic gastroesophageal reflux disorder, which is a common condition in western populations. The malignant progression to EAC follows a generally accepted series of stages, from metaplasia, to low-grade dysplasia (LGD), to high-grade dysplasia (HGD), and then to adenocarcinoma, with the involvement of genetic and epigenetic modifications.

Despite aggressive treatment, the 5-year survival rate for EAC is low at just 9 to 24%. This is likely due to late stage diagnosis: approximately two thirds of patients who are diagnosed have advanced-stage disease, at which point current therapies are largely ineffective. Current screening protocols for EAC generally involve endoscopic screening of patients with high risk chronic gastroesophageal reflux disorder to determine the degree of dysplasia in endoscopic biopsy samples. Those with HGD are candidates for endoscopic mucosal ablation or esophageal resection to slow or prevent disease progression. However, these endoscopic screening programs have limitations associated with sampling error, variability in assessment of biopsies between practitioners, and tissue heterogeneity. False positives occur and, conversely, invasive cancer has been found in up to 40% of patients despite negative endoscopic results. Moreover, even with these endoscopic screening programs, more than 80% of EACs are diagnosed without any prior diagnosis of BE or gastroesophageal reflux disorder, more than 80% of patients with BE are undiagnosed (and thus not recommended for subsequent and ongoing screening programs), and many patients undergoing routine screening never progress to EAC. This indicates that current screening methodologies are not particularly effective at identifying patients at high risk and distinguishing between those that progress to EAC and those that don't. Hence, there is an unmet clinical need for improved methods for EAC diagnosis.

SUMMARY OF THE INVENTION

The present invention is predicated in part on the identification of serum glycoproteins that are differentially glycosylated in subjects with EAC, BE and in healthy subjects (i.e., subjects having a healthy condition (HC)). Thus, subjects with EAC have a different serum glycosylation "signature" or "profile" than patients with BE and healthy patients, and patients with BE have different a serum glycosylation signature or profile than healthy patients. Accordingly, as described herein, detecting the level of one or more of these different types of glycosylation in a biological sample, such as a blood, serum or plasma sample, from a subject can be used to determine the likelihood of presence of absence of either EAC or BE in the subject. Monitoring the levels of one or more of the types of glycosylation identified herein can also be used to monitor the progress of EAC or BE, such as before, during and/or after treatment. Accordingly, in some aspects, monitoring the levels of one or more types of glycosylation identified herein can also be used to monitor the efficacy of treatment of EAC or BE.

The present invention thus represents a significant advance over current technologies for the management of EAC and BE. In certain advantageous embodiments, it relies upon measuring the level of at least one glycospecies. The present invention also provides robust biomarkers for determining the likelihood of the presence or absence of EAC or BE.

In one aspect, the invention provides a method for determining the likelihood of the presence or absence of a condition selected from a HC, EAC and BE in a subject, the method comprising determining in a sample from the subject the level of a glycospecies of a glycoprotein, which glycospecies is differentially expressed between at least two of HC, EAC and BE, and determining a likelihood of the subject having or not having the condition based on whether the level of the glycospecies is above or below a predetermined threshold that correlates with the presence of the condition.

In some embodiments, the methods determine the likelihood that EAC is present or absent in a subject, wherein the method comprises determining in a sample from the subject the level of a glycospecies of a glycoprotein, which glycospecies is differentially expressed between EAC and one or more other conditions (e.g., a HC and/or BE), and determining the likelihood of EAC being present or absent in the subject based on whether the level of the glycospecies is above or below a predetermined threshold that correlates with the presence or absence of EAC.

In some embodiments, the methods determine the likelihood that BE is present or absent in a subject, wherein the methods comprise determining in a sample from the subject the level of a glycospecies of a glycoprotein, which glycospecies is differentially expressed between BE and one or more other conditions (e.g., a HC and/or EAC), and determining a likelihood of BE being present or absent in the subject based on whether the level of the glycospecies is above or below a predetermined threshold that correlates with the presence or absence of BE.

In some embodiments, the methods determine the likelihood of the subject having a HC in a subject, that is the absence of EAC and/or BE. In such embodiments, the methods comprise determining in a sample from the subject the level of a glycospecies of a glycoprotein, which glycospecies is differentially expressed between HC and one or more other conditions (e.g., BE and/or EAC), and determining the likelihood of the subject having or not having a HC based on whether the level of the glycospecies is above or below a predetermined threshold that correlates with the presence or absence of a HC.

In another aspect, the invention provides methods for determining the likelihood of the presence or absence of a condition selected from a HC, EAC and BE in a subject, the method comprising determining in a sample from the subject the respective levels of a plurality of glycospecies of one or more glycoproteins, wherein individual glycospecies are differentially expressed between at least two of HC, EAC and BE, and determining a likelihood of the subject having or not having the condition based on whether the respective levels of the individual glycospecies are above or below a corresponding predetermined threshold that correlates with the presence or absence of the condition.

In some embodiments of this aspect, the methods determine the likelihood of EAC being present or absent in a subject, wherein the methods comprise determining in a sample from the subject the respective levels of a plurality of glycospecies of one or more glycoproteins, wherein individual glycospecies are differentially expressed between EAC and one or more other conditions (e.g., a HC and/or BE), and determining a likelihood of the subject having or not having EAC based on whether the respective levels of the individual glycospecies are above or below a corresponding predetermined threshold that correlates with the presence or absence of EAC.

In some embodiments, the methods determine the likelihood of BE being present or absent in a subject, in which the methods comprise determining in a sample from the subject the respective levels of a plurality of glycospecies of one or more glycoproteins, wherein individual glycospecies are differentially expressed between BE and one or more other conditions (e.g., a HC and/or EAC), and determining a likelihood of the subject having or not having BE based on whether the respective levels of the individual glycospecies are above or below a corresponding predetermined threshold that correlates with the presence or absence of BE.

In other embodiments, the methods for determining the likelihood of the presence or absence of a HC in a subject comprise determining in a sample from the subject the respective levels of a plurality of glycospecies of one or more glycoproteins, wherein individual glycospecies are differentially expressed between HC and one or more other conditions (e.g., BE and/or EAC), and determining a likelihood of the subject having or not having HC based on whether the respective levels of the individual glycospecies are above or below a corresponding predetermined threshold that correlates with the presence or absence of HC.

In some embodiments, an individual glycoprotein comprises a first glycospecies and a second glycospecies wherein the first glycospecies is differentially expressed between a plurality of conditions and the second glycospecies is not so differentially expressed.

In some preferred embodiments the glycoprotein is selected from the group comprising or consisting of: afamin, alpha-1-antichymotrypsin, alpha-1-antitrypsin, alpha-1-acid glycoprotein 1, alpha-1B-glycoprotein, alpha-2-antiplasmin, alpha-2-HS-glycoprotein, alpha-2-macroglobulin, alpha-2-antiplasmin, antithrombin-III, apolipoprotein B-100, beta-2-glycoprotein 1, C4b-binding protein alpha chain, ceruloplasmin, coagulation factor XII, complement C1q subcomponent subunit B, complement C5, complement component C7, complement component C9, complement factor B, ficolin-3, gelsolin, haptoglobin, hemopexin, plasma protease C1 inhibitor, serum paraoxonase/arylesterase 1, and serotransferrin.

In some embodiments, the level of an individual glycospecies is determined by contacting the sample with a glycan-binding molecule specific for the glycospecies, under conditions that permit binding of the glycan-binding molecule to the glycospecies. The glycan-binding molecule is suitably selected from the group consisting of a lectin, a glycospecific antibody, a glycospecific aptamer, a glycospecific peptide, and a glycospecific small molecule.

Illustrative lectins suitable for this purpose include *Aleuria aurantia* lectin (AAL); erythroagglutinating phytohemagglutinin (EPHA); jacalin (JAC); *Narcissus pseudonarcissus* lectin (NPL); *Pisum sativum* agglutinin (PSA); wheat germ agglutinin (WGA); *Bauhinia purpurea* lectin (BPL); *Erythrina cristagalli* agglutinin (ECA); soybean agglutinin (SBA); *Helix pomatia* agglutinin (HPA); *Wisteria floribunda* agglutinin (WFA); *Datura stramonium* lectin (DSA); *Helix aspersa* agglutinin (HAA); *Solanum tuberosum* lectin (STL); concanavalin A (ConA); *Galanthus nivalis* lectin (GNL); *Ulex europeus* agglutinin-I (UEA); *Maackia amurensis* agglutinin-II (MAA), *Sambucus nigra* agglutinin (SNA); and leukoagglutinating phytohemagglutinin (LPHA).

In some embodiments, glycospecies that are differentially expressed between subjects with EAC and healthy subjects are selected from the group comprising or consisting of: complement component AAL-binding complement component C9, EPHA-binding complement component C9, JAC-binding complement component C9, NPL-binding complement component C9, PSA-binding complement component C9, WGA-binding complement component C9, AAL-binding gelsolin, EPHA-binding gelsolin, JAC-binding gelsolin, PSA-binding gelsolin, EPHA-binding haptoglobin, NPL-binding haptoglobin, PSA-binding haptoglobin, WGA-binding haptoglobin, JAC-binding complement factor B, JAC-binding alpha-1-antichymotrypsin, NPL-binding alpha-1-antichymotrypsin, WGA-binding alpha-1-antichymotrypsin, JAC-binding complement C5, JAC-binding hemopexin, JAC-binding C4b-binding protein alpha chain, NPL-binding C4b-binding protein alpha chain, JAC-binding plasma protease C1 inhibitor, JAC-binding hemopexin, AAL-binding alpha-1-acid glycoprotein 1, EPHA-binding alpha-1-acid glycoprotein 1, JAC-binding ceruloplasmin, NPL-binding ceruloplasmin, NPL-binding antithrombin-III, STL-binding ficolin-3, WGA-binding complement C1q subcomponent subunit B.

Preferably, the glycospecies (i.e., defined by the glycan-binding molecule (e.g., lectin) and the glycoprotein to which it binds) that are differentially expressed between EAC and HC are selected from TABLE 1:

TABLE 1

| Lectin | Glycoprotein Overexpressed | Underexpressed |
|---|---|---|
| AAL | complement component C9 | gelsolin |
| PSA | haptoglobin, complement component C9 | gelsolin |
| EPHA | haptoglobin, complement component C9 | gelsolin, alpha-2-macroglobulin, alpha-2-HS-glycoprotein |
| JAC | complement factor B, alpha-1-antichymotrypsin, complement C5, complement component C9, hemopexin, C4b-binding protein alpha chain, plasma protease C1 inhibitor, heparin cofactor 2 | gelsolin |
| NPL | haptoglobin, alpha-1-antichymotrypsin, complement component C9, C4b-binding protein alpha chain | |

TABLE 1-continued

| Lectin | Glycoprotein Overexpressed | Underexpressed |
|---|---|---|
| WGA | haptoglobin, alpha-1-antichymotrypsin, complement component C9 | |

In specific embodiments, the glycospecies that are differentially expressed between EAC and HC are selected from TABLE 2:

TABLE 2

| Lectin | Glycoprotein Overexpressed | Underexpressed |
|---|---|---|
| AAL | complement component C9 | gelsolin |
| EPHA | haptoglobin, complement component C9 | gelsolin, alpha-2-HS-glycoprotein |
| JAC | alpha-1-antichymotrypsin, complement component C9, plasma protease C1 inhibitor | gelsolin |
| NPL | haptoglobin, alpha-1-antichymotrypsin, complement component C9 | |

In other embodiments, the glycospecies that are differentially expressed between EAC and HC are selected from the group comprising or consisting of those listed in TABLE 3:

TABLE 3

| Lectin | Glycoprotein Overexpressed | Underexpressed |
|---|---|---|
| AAL | alpha-1-antichymotrypsin, alpha-1-antitrypsin, complement component C9, alpha-1B-glycoprotein, complement C1s subcomponent, complement component C7, alpha-1-acid glycoprotein 2 | fibrinogen gamma chain, retinol-binding protein 4, gelsolin, vitamin K-dependent protein S, insulin-like growth factor-binding protein complex acid labile subunit, N-acetylmuramoyl-L-alanine amidase, afamin |
| EPHA | haptoglobin, complement factor B, alpha-1-antichymotrypsin, complement component C9, complement C1s subcomponent, complement component C7 | fibrinogen gamma chain, alpha-2-HS-glycoprotein, gelsolin, cadherin-5, haemoglobin subunit beta, N-acetylmuramoyl-L-alanine amidase |
| JAC | haptoglobin, alpha-1-antichymotrypsin, alpha-1-antitrypsin, fibrinogen gamma chain, complement component C9, alpha-2-HS-glycoprotein, plasma protease C1 inhibitor, complement C1s subcomponent | apolipoprotein A-I, fibrinogen beta chain, retinol-binding protein 4, plasma kallikrein, gelsolin, vitamin K-dependent protein S, kallistatin, cadherin-5, insulin-like growth factor-binding protein complex acid labile subunit, centriolin, N-acetylmuramoyl-L-alanine amidase, haemoglobin subunit beta, serotransferrin, fibrinogen gamma chain |
| NPL | haptoglobin, alpha-1-antichymotrypsin, alpha-1-antitrypsin, complement component C9, serotransferrin, hemopexin, alpha-1B-glycoprotein | apolipoprotein A-I, alpha-1B-glycoprotein, gelsolin, vitamin K-dependent protein S, serum paraoxonase/arylesterase 1, cadherin-5, insulin-like growth factor-binding protein complex acid labile subunit, alpha-1-acid glycoprotein 2, haemoglobin subunit beta, serum paraoxonase/lactonase 3, N-acetylmuramoyl-L-alanine amidase |

In yet other embodiments, the glycospecies that are differentially expressed between subjects with a HC and those with BE are selected from the group comprising or consisting of: EPHA-binding alpha-2-macroglobulin, JAC-binding apolipoprotein B-100, NPL-binding apolipoprotein B-100, AAL-binding ficolin-3, STL-binding ficolin-3, AAL-binding complement C1q subcomponent subunit C, EPHA-binding protein AMBP, EPHA-binding alpha-1-acid glycoprotein 1, JAC-binding coagulation factor XII, NPL-binding antithrombin-III, SNA-binding alpha-2-antiplasmin, and STL-binding ceruloplasmin.

Preferably, the glycospecies (i.e., defined by the glycan-binding molecule (e.g., lectin) and the glycoprotein to which it binds) that are differentially expressed between BE and a HC are selected from TABLE 4:

TABLE 4

| Lectin | Glycoprotein | |
|---|---|---|
| | Overexpressed | Underexpressed |
| EPHA | | alpha-2-macroglobulin |
| JAC | apolipoprotein B-100 | |
| NPL | apolipoprotein B-100 | |

In specific embodiments, the glycospecies that are differentially expressed between EAC and HC are selected from JAC-binding apolipoprotein B-100 and NPL-binding apolipoprotein B-100.

In other embodiments, the glycospecies that are differentially expressed between subjects with BE and those with a HC are selected from those listed in TABLE 5:

TABLE 5

| Lectin | Glycoprotein | |
|---|---|---|
| | Overexpressed | Underexpressed |
| AAL | lumican | |
| EPHA | lumican | Prothrombin, fibronectin |
| JAC | | apolipoprotein M, prothrombin, angiotensinogen, apolipoprotein A-I, fibrinogen beta chain, plasma kallikrein, apolipoprotein B-100, histidine-rich glycoprotein, vitamin K-dependent protein S, complement component C8 alpha chain, complement factor H, alpha-2-antiplasmin, kallistatin, afamin, hemoglobin subunit beta. |
| NPL | beta-2-glycoprotein 1 | apolipoprotein B-100, alpha-2-antiplasmin, cadherin-5, hemoglobin subunit beta |

In yet other embodiments, glycospecies that are differentially expressed between subjects with EAC and subjects with BE are selected from the group comprising or consisting of: AAL-binding complement component C9, EPHA-binding complement component C9, WGA-binding complement component C9, JAC-binding complement component C9, NPL-binding complement component C9, PSA-binding complement component C9, AAL-binding gelsolin, EPHA-binding gelsolin, JAC-binding gelsolin, PSA-binding gelsolin, NPL-binding gelsolin, WGA-binding gelsolin, AAL-binding haptoglobin, EPHA-binding haptoglobin, JAC-binding haptoglobin, PSA-binding haptoglobin, WGA-binding haptoglobin, JAC-binding complement factor B, EPHA-binding alpha-1-antichymotrypsin, PSA-binding alpha-1-antichymotrypsin, JAC-binding alpha-1-antichymotrypsin, AAL-binding complement C5, JAC-binding complement C5, PSA-binding complement C5, AAL-binding complement component C7, PSA-binding complement component C7, EPHA-binding complement component C7, JAC-binding complement component C7, AAL-binding apolipoprotein B-100, NPL-binding apolipoprotein B-100, EPHA-binding serotransferrin, JAC-binding alpha-1-antitrypsin, JAC-binding alpha-1B-glycoprotein, AAL-binding alpha-1-acid glycoprotein 1, AAL-binding ficolin-3, AAL-binding complement C1q subcomponent subunit C, AAL-binding alpha-1-acid glycoprotein 1, JAC-binding ceruloplasmin, STL-binding ceruloplasmin, JAC-binding coagulation factor XII, and SNA-binding alpha-2-antiplasmin.

Preferably, the glycospecies (i.e., defined by the glycan-binding molecule (e.g., lectin) and the glycoprotein to which it binds) that are differentially expressed between EAC and BE are selected from TABLE 6:

TABLE 6

| Lectin | Glycoprotein | |
|---|---|---|
| | Overexpressed | Underexpressed |
| AAL | haptoglobin, complement 5, complement component C9, complement component C7 | apolipoprotein B-100, gelsolin |
| PSA | haptoglobin, alpha-1-antichymotrypsin, complement 5, complement component C9, complement component C7 | gelsolin |
| EPHA | haptoglobin, alpha-1-antichymotrypsin, complement component C9, serotransferrin, complement component C7 | gelsolin |
| JAC | haptoglobin, complement factor B, alpha-1-antitrypsin, alpha-1-antichymotrypsin, complement C5, complement component C9, alpha-1B-glycoprotein, complement component C7 | gelsolin |
| NPL | complement component C9 | apolipoprotein B-100, gelsolin, afamin |
| WGA | haptoglobin, complement component C9 | gelsolin |

In specific embodiments, the glycospecies that are differentially expressed between EAC and BE are selected from AAL-binding complement component C9, EPHA-binding complement component C9, JAC-binding complement component C9, NPL-binding complement component C9, JAC-binding alpha-1-antichymotrypsin, JAC-binding alpha-1B-glycoprotein; NPL-binding gelsolin; and EPHA-binding gelsolin.

In other embodiments, the glycospecies that are differentially expressed between EAC and BE are selected from those listed in TABLE 7:

TABLE 7

| Lectin | Glycoprotein | |
|---|---|---|
| | Overexpressed | Underexpressed |
| AAL | Prothrombin, complement component C9 | Retinol-binding protein 4 |

TABLE 7-continued

| | Glycoprotein | |
|---|---|---|
| Lectin | Overexpressed | Underexpressed |
| EPHA | Complement factor B, complement component C9, | beta-2-glycoprotein 1, gelsolin, lumican, serum paraoxonase/lactonase 3 |
| JAC | Ceruloplasmin, prothrombin, alpha-1-antichymotrypsin, complement component C9, hemopexin, alpha-1B-glycoprotein, plasma protease C1 inhibitor, complement factor I, complement factor H, complement C1s subcomponent, C4b-binding protein beta chain, Inter-alpha-trypsin inhibitor heavy chain H4 | |
| NPL | Complement component C9 | gelsolin |

In some preferred embodiments, the methods of the invention comprise determining the level of 2, 3, 4, 5, 7, 8, 9, 10, 11, 12, 13, 14, 15, 16, 17, 18, 19, 20 or more than 20 glycospecies of one or more glycoproteins. For example, the one or more glycoproteins may optionally be selected from the group comprising: complement component 9, gelsolin, alpha-1B-glycoprotein, angiotensinogen, and alpha-2-macroglobulin. More specifically, the glycospecies may suitably comprise complement component 9 selected from the group comprising or consisting of: JAC-binding complement component 9, NPL-binding complement component 9 and WGA-binding complement component 9. Alternatively, or in addition, the glycospecies may also comprise gelsolin selected from the group comprising or consisting of EPHA-binding gelsolin and SNA-binding gelsolin. Alternatively, or in further addition to these glycospecies, the glycospecies may also be one or more of EPHA-binding alpha-1B-glycoprotein, WGA-binding angiotensinogen, and NPL-binding alpha-2-macroglobulin.

In some embodiments, the predetermined threshold of the method described herein, represents the level of a corresponding glycospecies in a sample from a control subject, or represents a value above or below the level of the glycospecies in a sample from a control subject, which level correlates with the presence of the selected condition. For example, the control subject may have EAC or BE. Alternatively, the control subject is a healthy subject that does not have EAC or BE.

In yet another aspect, the invention provides a method for determining the likelihood of the presence or absence of a condition selected from a HC, EAC and BE in a subject, the method comprising determining in a sample from the subject the ratio of a level of a glycospecies of a glycoprotein to the total level of the glycoprotein in the sample, which glycospecies is differentially expressed between at least two of HC, EAC and BE, and determining a likelihood of the subject having or not having the condition based on whether the ratio of the glycospecies is above or below a predetermined threshold that correlates with the presence or absence of the condition.

In a related aspect, the methods determine the likelihood of EAC being present or absent in a subject, in which the method comprises determining in a sample from the subject the ratio of a level of a glycospecies of a glycoprotein to the total level of the glycoprotein in the sample, which glycospecies is differentially expressed between EAC and one or more other conditions (e.g., a HC and/or BE), and determining a likelihood of EAC being present or absent in the subject based on whether the ratio is above or below a predetermined threshold that correlates with the presence or absence of EAC.

In another related aspect, the methods determine the likelihood of BE being present or absent in a subject, wherein the methods comprise determining in a sample from the subject the ratio of a level of a glycospecies of a glycoprotein to the total level of the glycoprotein in the sample, which glycospecies is differentially expressed between BE and one or more other condition (e.g., a HC and/or EAC), and determining a likelihood of the subject having or not having BE based on whether the ratio is above or below a predetermined threshold that correlates with the presence or absence of BE In yet another related aspect, the methods determining the likelihood of the subject having or not having a HC, the method comprising determining in a sample from the subject the ratio of a level of a glycospecies of a glycoprotein to the total level of the glycoprotein in the sample, which glycospecies is differentially expressed between a HC and one or more other conditions (e.g., BE and/or EAC), and determining a likelihood of the subject having or not having a HC based on whether the ratio is above or below a predetermined threshold that correlates with the presence or absence of a HC.

In preferred embodiments, the determination is made based on the levels or ratios of a plurality of glycospecies of one or more glycoproteins.

In some embodiments, upon determining that the likelihood of EAC being present in the subject is above the predetermined threshold, the subject is suitably exposed to a treatment regimen for treating EAC. The treatment regimens optionally comprise surgery, radiotherapy or chemotherapy. For example, surgery to remove all or part of the esophagus may be performed.

In some embodiments, the determination method is performed by a person who also exposes the subject to the treatment regimen. Alternatively, the sample from the subject can be provided to another person (e.g., a person in a laboratory) to perform the determination method before providing the results of the determination method to the person who exposes the subject to the treatment regimen.

In another aspect, the invention provides a method of monitoring the progression of EAC in a subject, comprising determining in a first sample from the subject the level of a glycospecies of a glycoprotein, determining in a second sample from the subject the level of the glycospecies, wherein the second sample is taken at a later time than the first sample, and comparing the levels in the first and second sample, wherein an increase or decrease in the level of the glycospecies in the second sample compared to the first sample correlates with the progression or regression of EAC.

In a related aspect, the invention also provides a method for monitoring the progression of EAC in a subject, comprising: determining in a first sample from the subject the respective levels of a plurality of glycospecies of one or more glycoproteins, determining in a second sample from the subject the respective levels of the plurality of glycospecies, wherein the second sample is taken at a later time than the first sample, and comparing the respective levels in the first and second sample, wherein an increase or decrease in the level of the glycospecies in the second sample compared to the first sample correlates with the progression or regression of EAC.

In yet another related aspect, the invention provides a method for monitoring the progression of EAC in a subject, comprising determining in a first sample from the subject the respective ratios of the levels of a plurality of glycospecies of one or more glycoproteins to the total levels of the one or more glycoproteins, determining in a second sample from the subject the respective ratios of the levels of the plurality of glycospecies to the total levels of the glycoproteins, wherein the second sample is taken from the subject at a later time than the first sample, and comparing the respective ratios in the first and second sample, wherein an increase or decrease in the ratio of the glycospecies in the second sample compared to the first sample correlates with the progression or regression of EAC.

The present findings also enable methods of monitoring the efficacy of a treatment regimen for treating a condition selected from a HC, EAC and BE, and determining a subject's response to such treatment (e.g., whether it is a positive or negative response to such treatment). Thus, in another aspect, a method is provided for monitoring the efficacy of a particular treatment regimen in a subject towards a desired health state (e.g., HC), the method comprising: (1) providing a correlation of a reference glycospecies profile with the likelihood of having HC, wherein the reference glycospecies profile evaluates at least one glycospecies (e.g., 1, 2, 3, 4, 5, 6, 7, 8, 9, 10 or more glycospecies) of one or more glycoproteins, (2) obtaining a corresponding glycospecies profile of a subject having HC, EAC or BE after treatment with a treatment regimen, wherein a similarity of the subject's glycospecies profile after treatment to the reference glycospecies profile indicates the likelihood that the treatment regimen is effective for changing the health status of the subject to the desired health state.

Still another aspect of the present invention provides a method for correlating a reference glycospecies profile with an effective treatment regimen for a condition selected from HC, EAC and BE, wherein the reference glycospecies profile evaluates at least one glycospecies (e.g., 1, 2, 3, 4, 5, 6, 7, 8, 9 or more glycospecies), the method comprising: (a) determining a sample glycospecies profile from a subject with the condition prior to treatment, wherein the sample glycospecies profile evaluates for at least one glycospecies in the reference glycospecies profile a corresponding glycospecies, and correlating the sample glycospecies profile with a treatment regimen that is effective for treating the condition in the subject.

In another aspect, the present invention provides a method for determining whether a treatment regimen is effective for treating a subject with a condition selected from HC, EAC and BE, the method comprising: (a) correlating a reference glycospecies profile prior to treatment with an effective treatment regimen for the condition, wherein the reference glycospecies profile evaluates at least one glycospecies (e.g., 1, 2, 3, 4, 5, 6, 7, 8, 9 or more glycospecies), and (b) obtaining a sample glycospecies profile from the subject after treatment, wherein the sample glycospecies profile evaluates for an individual glycospecies in the reference glycospecies profile a corresponding glycospecies, and wherein the sample glycospecies profile after treatment indicates whether the treatment regimen is effective for treating the condition in the subject.

In a further aspect, the present invention provides a method for correlating a glycospecies profile with a positive or negative response to a treatment regimen for a condition selected from HC, EAC and BE, the method comprising: (a) obtaining a glycospecies profile from a subject with the condition following commencement of the treatment regimen, wherein the glycospecies profile evaluates at least one glycospecies (e.g., 1, 2, 3, 4, 5, 6, 7, 8, 9 or more glycospecies), and (b) correlating the glycospecies profile from the subject with a positive or negative response to the treatment regimen.

Another aspect of the present invention provides a method for determining a positive or negative response to a treatment regimen by a subject with a condition selected from HC, EAC and BE, the method comprising: (a) correlating a reference glycospecies profile with a positive or negative response to the treatment regimen, wherein the reference glycospecies profile evaluates at least one glycospecies (e.g., 1, 2, 3, 4, 5, 6, 7, 8, 9 or more glycospecies), and (b) determining a sample glycospecies profile from the subject, wherein the subject's sample glycospecies profile evaluates for an individual glycospecies in the reference glycospecies profile a corresponding glycospecies and indicates whether the subject is responding to the treatment regimen.

In some embodiments, the methods for determining a positive or negative response to a treatment regimen further comprise: determining a first sample glycospecies profile from the subject prior to commencing the treatment regimen, wherein the first sample glycospecies profile evaluates at least one glycospecies (e.g., 1, 2, 3, 4, 5, 6, 7, 8, 9 or more glycospecies), and comparing the first sample glycospecies profile with a second sample glycospecies profile from the subject after commencement of the treatment regimen, wherein the second sample glycospecies profile evaluates for an individual glycospecies in the first sample glycospecies profile a corresponding glycospecies.

Evaluation of glycospecies suitably includes determining the levels of individual glycospecies, which correlate with the presence of a condition, as broadly described above and elsewhere herein.

In yet another aspect, the present invention provides a method of monitoring or screening individuals characterized as being at an increased risk of developing BE and/or EAC for the likelihood of the subject having or not having EAC or BE. Illustrative known risk factors for developing either or these conditions are known to be males over 40 years of age who are diagnosed as obese (i.e., identified as accumulating high levels of abdominal visceral fat, dietary fat), having a high cholesterol intake, suffering from acid reflux (gastroesophageal reflux disease), and smoking. Accordingly, the present invention further provides a method of monitoring or screening a high risk subject for BE or EAC, the method comprising determining in a sample from the subject the level of a glycospecies of a glycoprotein, which glycospecies is differentially expressed between at least two of HC, EAC and BE, and determining a likelihood of the subject having or not having the condition based on whether the level of the glycospecies is above or below a predetermined threshold that correlates with the presence or absence of the condition. In some embodiments, a sample from the subject can be compared with a previous sample taken at an earlier date from the subject to determine the change in the levels of the glycospecies over time, and thus determine whether the likelihood of the subject developing BE or EAC is increasing.

DETAILED DESCRIPTION OF THE INVENTION

1. Definitions

Figure 1:
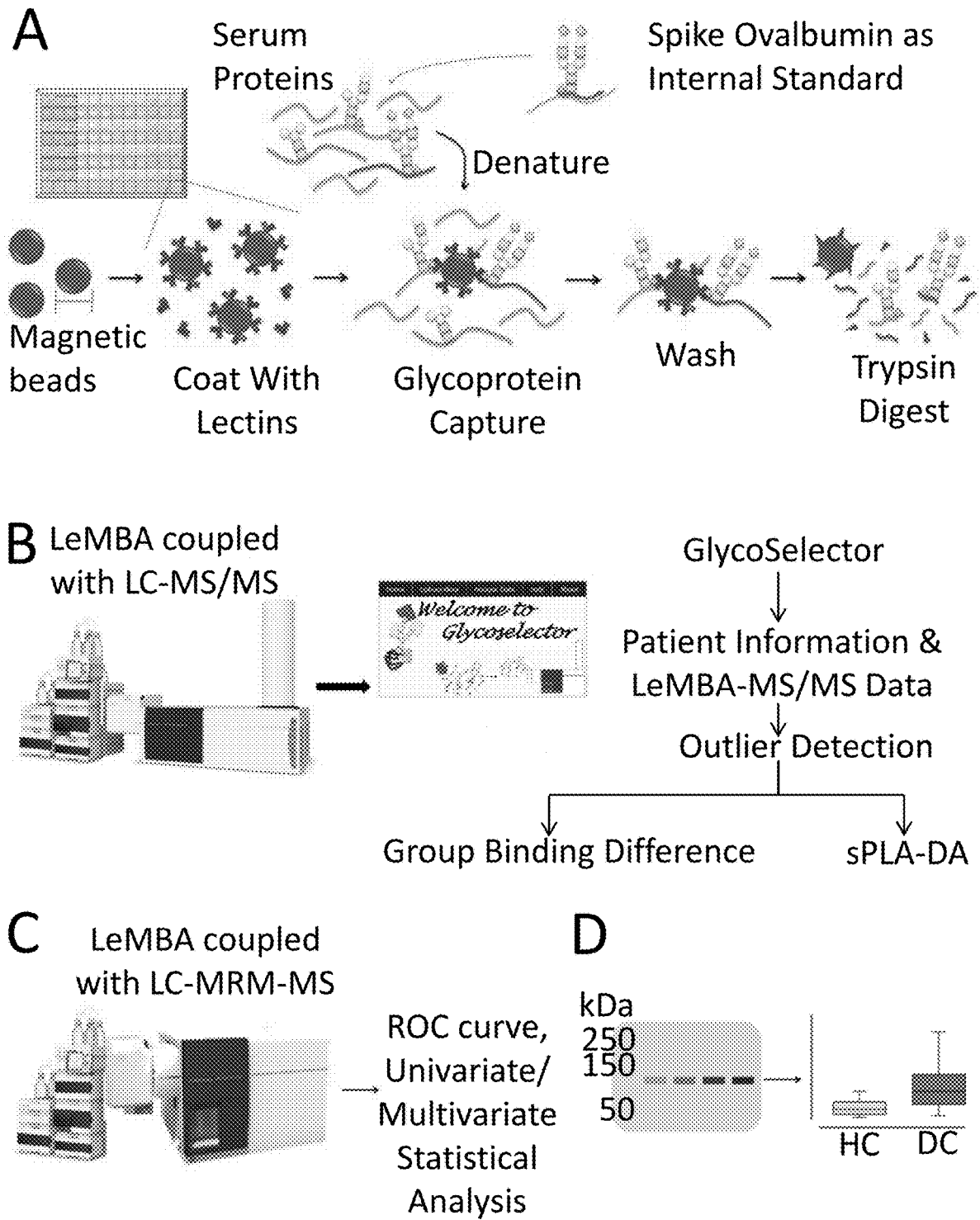
FIG. 1 is a schematic of the (A) lectin magnetic bead array (LeMBA), (B) biomarker discovery, and (C)-(D) biomarker verification processes. Two approaches are shown in (B) for biomarker discovery. The group binding difference method identifies candidates that are present in one group and absent in another group. Sparse partial least squares-discriminant analysis (sPLS-DA) combined with stability analyses generate a ranked list of candidates. The analysis illustrated in (D) shows LeMBA coupled with western immunoblotting for protein level verification. (MS: mass spectrometry; IB: immunoblotting; HC: healthy condition; DC: disease condition).

Unless defined otherwise, all technical and scientific terms used herein have the same meaning as commonly understood by those of ordinary skill in the art to which the invention belongs. Although any methods and materials similar or equivalent to those described herein can be used in the practice or testing of the present invention, preferred methods and materials are described. For the purposes of the present invention, the following terms are defined below.

The articles "a" and "an" are used herein to refer to one or to more than one (i.e. to at least one) of the grammatical object of the article. By way of example, "a glycospecies" means one glycospecies or more than one glycospecies.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements.

The term "control subject", as used in the context of the present invention, may refer to a subject known to be affected with a disease condition (e.g., EAC or BE) (positive control), or to a subject known to be not affected or diagnosed with the disease condition (negative control), i.e., healthy. It should be noted that a control subject that is known to be healthy, i.e., not suffering from the disease condition, may possibly suffer from another disease not tested/known. It is also understood that control subjects and healthy controls include data obtained and used as a standard, i.e. it can be used over and over again for multiple different subjects. In other words, for example, when comparing a subject sample to a control sample, the data from the control sample could have been obtained in a different set of experiments, for example, it could be an average obtained from a number of healthy subjects and not actually obtained at the time the data for the subject was obtained.

The term "correlating" generally refers to determining a relationship between one type of data with another or with a state. In various embodiments, correlating a glycospecies profile with the presence or absence of a condition (e.g., a condition selected from a HC, EAC and BE) comprises determining the presence, absence or amount of at least one glycospecies in a subject that suffers from that condition, or in persons known to be free of that condition. In specific embodiments, a profile of glycospecies levels, absences or presences is correlated to a global probability or a particular outcome, using receiver operating characteristic (ROC) curves.

By "corresponding glycoprotein" is meant a glycoprotein biomarker that is structurally and/or functionally similar to or the same as a glycospecies biomarker. Representative corresponding glycoproteins include other glycospecies of the glycoprotein, and isoforms of the glycoprotein without any glycosylation.

The term "differential expression" of glycospecies as used herein, means qualitative and/or quantitative differences in the temporal and/or local glycospecies expression patterns, e.g., between a biological sample taken from subjects with a condition as compared to a comparable sample taken from subjects lacking the condition. Thus, a differentially expressed glycospecies may qualitatively have its expression altered, including an activation or inactivation in, for example, a biological sample from a subject with a disease condition (e.g., EAC) or disease susceptible condition (e.g., BE) versus a biological condition from a healthy subject. The difference in glycospecies expression may also be quantitative, e.g., in that expression is modulated, i.e., either overexpressed, resulting in an increased amount of glycospecies, or underexpressed, resulting in a decreased amount of glycospecies. The degree to which glycospecies expression differs need only be large enough to be quantified via standard quantification or characterization techniques. For example, a glycospecies is differentially expressed between the samples if the amount of the glycospecies in one sample is significantly different (i.e., $p<0.05$) from the amount of the glycospecies in the other sample. It should be noted that if the glycospecies is detectable in one sample and not detectable in the other, then the glycospecies can be considered to be differentially present.

As used herein, the term "likelihood" is used as a measure of whether subjects with a particular glycospecies profile actually have a condition (or not) based on a given mathematical model. An increased likelihood for example may be relative or absolute and may be expressed qualitatively or quantitatively. For instance, an increased risk may be expressed as simply determining the subject's level of a given glycospecies and placing the test subject in an "increased risk" category, based upon previous population studies. Alternatively, a numerical expression of the test subject's increased risk may be determined based upon glycospecies level analysis.

Most naturally occurring secreted proteins (or peptides) comprise carbohydrate or saccharide moieties attached to the peptide via specific linkages to a select number of amino acids along the length of the primary peptide chain. Thus, many naturally occurring peptides are termed "glycopeptides" or "glycoproteins" or are referred to as "glycosylated" proteins or peptides.

The predominant sugars found on glycoproteins are glucose, galactose, mannose, fucose, N-acetylgalactosamine ("GalNAc"), N-acetylglucosamine ("GlcNAc") and sialic acid (e.g., N-acetylneuraminic acid ("NANA" or "NeuAc", where "Neu" is neuraminic acid) and "Ac" refers to "acetyl"). The processing of the sugar groups occurs co-translationally in the lumen of the ER and continues in the Golgi apparatus for N-linked glycoproteins.

The oligosaccharide structure attached to the protein backbone is known as a "glycan" molecule. The glycan structures found in naturally occurring glycopeptides are typically divided into two classes, "N-linked glycans" or N-linked oligosaccharides" and "O-linked glycans" or O-linked oligosaccharides Peptides expressed in eukaryotic cells typically comprise N-glycans. "N-glycans" are N-glycosylated at an amide nitrogen of an asparagine or an arginine residue in a protein via an N-acetylglucosamine residue. These "N-linked glycosylation sites" occur in the peptide primary structure containing, for example, the amino acid sequence asparagine-X-serine/threonine, where X is any amino acid residue except proline and aspartic acid.

A "glycan-binding molecule" refers to any molecule that is capable of binding to a glycan component of a glycoprotein. Typically, the glycan-binding molecule is glycospecies-specific (or glycospecific) in that it selectively binds the glycan of one glycospecies of a glycoprotein but not another, such that it can be used to distinguish different glycospecies of the glycoprotein. Glycan-binding molecules can be natural or synthetic, and include, for example, lectins, glycospe-cific antibodies, glycospecific aptamers (e.g. RNA aptamer, DNA aptamer, or peptide aptamer), glycospecific peptides, and glycospecific small molecule.

As used herein, a "glycoprotein" refers to a protein having glycan structures associated with the polypeptide backbone. Glycoproteins can be associated with one or more types of glycosylation at a single or different sites. Glycoproteins that differ with respect to type of glycosylation generally have the same amino acid sequence or essentially the same amino acid sequence (e.g. isoforms, allelic variants and other variants are considered to have essentially the same amino acid sequence), while the glycan structures associated with a particular type of glycosylation differ by at least one glycan.

The term "glycospecies" refers to a glycoprotein with a distinct type of glycosylation. The "type" or glycosylation is characterized by the glycans present in the glycosylations on the surface of the glycoprotein. For example, a glycosylation may comprise fucose-related glycans, mannose-related glycans, sialic acid glycans, etc. A glycoprotein may be characterized as belonging to one, two, three, four, five or more than 5 different glycospecies (for example, a glycosylation may comprise both a fucose-related glycan, a mannose-related glycan and sialic acid-based glycan).

As used herein, a "healthy" subject is a subject that does not have EAC or BE.

As used herein, "level" with reference to a glycoprotein or glycospecies refers to the amount or concentration of the glycoprotein or glycospecies in a sample. The amount or concentration may be absolute or may be relative, and can be determined using any method known in the art.

In this regard, the term "underexpressed" and the like refer to a downward deviation in the level of expression of an EAC biomarker as compared to a baseline expression level of a corresponding EAC biomarker in a control sample. The term "overexpressed" refers to an upward deviation in the level of glycospecies as compared to a baseline expression level of a corresponding glycospecies in a control sample.

As used herein, the term "predetermined threshold" refers to a value, above or below which, indicates the presence of disease, such as EAC or BE or a healthy condition. For example, for the purposes of the present invention, a predetermined threshold may represent the level of a particular glycospecies of a glycoprotein, or the ratio of the level of a particular glycospecies of a glycoprotein to the total glycoprotein level, in a sample from an appropriate control subject, such as a healthy subject or a subject with BE, or in pooled samples from multiple control subjects or medians or averages of multiple control subjects. Thus, a level or ratio above or below the threshold indicates the presence of EAC or BE, as taught herein. In other examples, a predetermined threshold may represent a value larger or smaller than the level or ratio determined for a control subject so as to incorporate a further degree of confidence that a level or ratio above or below the predetermined threshold is indicative of the presence of disease, such as EAC or BE. For example, the predetermined threshold may represent the average or median level of a glycospecies in a group of control subjects, plus or minus 1, 2, 3 or more standard deviations. Those skilled in the art can readily determine an appropriate predetermined threshold based on analysis of biological samples from appropriate control subjects.

The term "receiver operating characteristic (ROC) curves" means a graphical measure of sensitivity (y-axis) vs. 1−specificity (x-axis) for a clinical test. An important measure of the accuracy of the clinical test is the area under the ROC curve value (AUC value). If this area is equal to 1.0 then this test is 100% accurate because both the sensitivity and specificity are 1.0 so there are no false positives and no false negatives. On the other hand a test that cannot discriminate that is the diagonal line from 0,0 to 1,1. The ROC area for this line is 0.5. ROC curve areas (AUC-values) are typically between 0.5 and 1.0, but also ROC values below 0.5 can—according to information theory—be as good, if the result is interpreted inversely. Therefore, according to the present invention an AUC-value close to 1 (e.g., 0.95) represents the same good measure for a clinical test as an AUC-value close to 0 (e.g., 0.05).

The terms "sample", "biological sample", and the like mean a material known or suspected of containing one or more glycospecies or other EAC/BE biomarkers. A test sample can be used directly as obtained from the source or following a pretreatment to modify the character of the sample. The sample is suitably derived from blood or plasma fractions, including cell fractions (e.g., comprising tumor cells) or lysates thereof, cell-free or cell-depleted fractions, and the like. The sample can be treated prior to use, such as diluting viscous fluids, and the like. Methods of treatment can involve filtration, distillation, extraction, concentration, inactivation of interfering components (e.g., inhibiting nucleases such as RNases and DNases), the addition of reagents, and the like The terms "subject", "individual" or "patient", used interchangeably herein, refer to any animal subject, particularly a mammalian subject, more particularly a human subject. In some embodiments, the subject presents with clinical signs of a condition as defined herein. As used herein, the term "clinical sign", or simply "sign", refers to objective evidence of a disease present in a subject. Symptoms and/or signs associated with diseases referred to herein and the evaluation of such signs are routine and known in the art. Examples of signs of disease vary depending upon the disease. Signs of EAC may include tumorigenesis, metastasis, angiogenesis. Typically, whether a subject has a disease, and whether a subject is responding to treatment, may be determined by evaluation of signs associated with the disease.

The terms "treat" and "treating" as used herein, unless otherwise indicated, refer to both therapeutic treatment and prophylactic or preventative measures, wherein the object is to prevent, either partially or completely, ameliorate or slow down (lessen) the targeted condition or disorder (e.g., EAC or BE), or one or more symptom associated therewith. The terms are also used herein to denote delaying the onset of, inhibiting (e.g., reducing or arresting the growth of), alleviating the effects of, or prolonging the life of a patient suffering from, cancer, in particular, EAC. Those in need of treatment include those diagnosed with the disorder, those suspected of having the disorder, those predisposed to have the disorder as well as those in whom the disorder is to be prevented. Hence, the subject to be treated herein may have been diagnosed as having the disorder or may be predisposed or susceptible to the disorder. In some embodiments, treatment refers to the eradication, removal, modification, or control of primary, regional, or metastatic cancer tissue that results from the administration of one or more therapeutic agents according to the methods of the invention. In other embodiments, such terms refer to the minimizing or delaying the spread of cancer resulting from the administration of one or more therapeutic agents to a subject with such a disease. In other embodiments, such terms refer to elimination of disease causing cells. The term "treatment" as used herein, unless otherwise indicated, refers to the act of treating.

As used herein, the term "treatment regimen" refers to prophylactic and/or prophylactic regimen (i.e., before the onset of EAC, e.g., if the subject is affected with BE), or to a therapeutic regimen (i.e., after the onset of EAC). The term "treatment regimen" encompasses natural substances and pharmaceutical agents (i.e., "drugs") as well as any other treatment regimen including but not limited to chemotherapy, radiotherapy, proton therapy, immunotherapy, hormone therapy, phototherapy, cryotherapy, cryosurgery, toxin therapy or pro-apoptosis therapy, high intensity focused ultrasound, dietary treatments, physical therapy or exercise regimens, surgical interventions, and combinations thereof.

Those skilled in the art will appreciate that the aspects and embodiments described herein are susceptible to variations and modifications other than those specifically described. It is to be understood that the disclosure includes all such variations and modifications. The disclosure also includes all of the steps, features, compositions and compounds referred to or indicated in this specification, individually or collectively, and any and all combinations of any two or more of said steps or features.

2. Biomarkers for BE and EAC and Uses Therefor

Glycosylation is a dynamic, post-translational modification that can be altered during the development and progression of a cancer, such as EAC, or a precancerous condition, such as BE. As a result, the same glycoprotein may be expressed both before and after oncogenic transformation, but the glycosylation of the glycoprotein before and after oncogenic transformation may be different.

Differences in the type of glycosylation include the removal of a glycan component, the addition of a glycan component, a change in the glycan component such as the substitution of one glycan component for another, the change in the branching of glycans, and the rearrangement of one or more glycan components on the glycoprotein, as where a glycan component is shifted from one position on the polypeptide sequence to another. Differential glycosylation can be detected using any of method known in the art, including but not limited to, methods that detect binding of a particular type of glycosylation to a glycan-binding molecule, such as a lectin, glycospecific antibody or glycospecific aptamer, as further described herein, that is selective and/or specific for the particular type of glycosylation. Differences in glycosylation can also be detected spectroscopically. For example mass spectrometry can be used to characterize the glycan component and distinguish between different types of glycosylation.

The present invention is predicated in part on the identification of serum glycoproteins that are differentially glycosylated in subjects with EAC, BE and in healthy patients. Accordingly, as described herein, detection of the levels of one or more of these different types of glycosylation on particular glycoproteins (i.e., one or more glycospecies) in a biological sample, such as a blood, serum or plasma sample, from a subject can be used to determine whether the subject has EAC, BE or is healthy (i.e. has neither BE or EAC). The glycospecies can thus be considered biomarkers for BE and EAC.

In some instances, the present invention provides a method comprising determining the ratio of a level of a glycospecies of a glycoprotein to the total level of the glycoprotein in the sample, which glycospecies is differentially expressed between at least two of EAC, BE and HC, and determining a likelihood of the subject having or not having a HC based on whether the ratio is above or below a predetermined threshold that correlates with the presence of or absence of EAC or BE. Monitoring the levels or ratios of one or more of the glycospecies identified herein can also be used to monitor the progress of disease, such as before, during and/or after treatment. For example, levels or ratios of a particular glycospecies identified herein as being increased or decreased in subjects with EAC compared to a healthy control subject or a control subject with BE can be monitored during or after treatment. A change in the level or ratio of one or more glycospecies in the subject over time to be more similar to those levels or ratios observed in control subjects indicates that the disease has regressed. Conversely, a change over time in the level or ratio of one or more glycospecies in the subject to be less similar to those levels or ratios observed in control subjects indicates that the disease has progressed. Methods of monitoring the disease progression of disease by assessing levels or ratios of one or more glycospecies are thus also useful in assessing the efficacy of treatment, e.g. for assessing whether the treatment has resulted in a regression of disease.

The glycoproteins identified herein as being differentially glycosylated in subjects with EAC, BE and in healthy subjects are selected from: afamin, alpha-1-antichymotrypsin, alpha-1-antitrypsin, alpha-1-acid glycoprotein 1, alpha-1-acid glycoprotein 2, alpha-1B-glycoprotein, alpha-2-antiplasmin, alpha-2-HS-glycoprotein, alpha-2-macroglobulin, alpha-2-antiplasmin, angiotensinogen, antithrombin-III, apolipoprotein A-I, apolipoprotein B-100, .apolipoprotein M, beta-2-glycoprotein 1, C4b-binding protein alpha chain, C4b-binding protein beta chain, cadherin-5, centriolin, ceruloplasmin, coagulation factor XII, complement C1q subcomponent subunit B, complement C1q subcomponent subunit C, complement C1s subcomponent, complement C5, complement component C7, complement component C8 alpha chain, complement component C9, complement factor B, complement factor H, complement factor I, fibrinogen gamma chain, fibronectin, ficolin-3, gelsolin, haptoglobin, hemoglobin subunit beta, hemopexin, histidine-rich glycoprotein, insulin-like growth factor-binding protein complex acid labile subunit, inter-alpha-trypsin inhibitor heavy chain H4, kallistatin, lumican, N-acetylmuramoyl-L-alanine amidase, plasma protease C1 inhibitor, plasma kallikrein, protein AMBP, prothrombin, retinol-binding protein 4, serotransferrin serum paraoxonase/arylesterase 1, serum paraoxonase/lactonase 3 and vitamin K-dependent protein S.

The various types of glycosylation associated with the above serum glycoproteins exhibit different lectin-binding properties resulting from the different glycan structures on the proteins. These types of glycosylation include, for example, glycosylations that bind to lectins having a general reactivity with α/β-D-Galactose, including *Bauhinia purpurea* lectin (BPL, known to bind at least Galβ1-3GalNAc), *Erythrina cristagalli* agglutinin (ECA, known to bind at least Galβ1-4GlcNAc), and jacalin (JAC, known to bind at least Galα1-6GalNAc and Galβ1-3GalNAc), lectins having a general reactivity with D-N-Acetylgalactosamine, including soybean agglutinin (SBA, known to bind to at least GalNAcα1-3Gal), *Helix pomatia* agglutinin (HPA, known to bind to at least α-GalNAc), *Wisteria floribunda* agglutinin (WFA, known to bind to at least GalNAcα1-6Gal and GalNAcα1-3GalNAc), *Datura stramonium* lectin (DSA, known to bind to at least β1-4GlcNAc oligomers), *Helix aspersa* agglutinin (HAA, known to bind to at least α-GlcNAc and α-GalNAc), *Solanum tuberosum* lectin (STL, known to bind to at least GlcNAcβ1-4GlcNAc oligomers), and wheat germ agglutinin (WGA, known to bind to at least GlcNAcβ1-4GlcNAc and Neu5Ac), lectins having a general reactivity with D-Mannose, including concanavalin A (ConA, known to bind to at least α-Man, α-Glc, and α-GlcNAc), *Galanthus nivalis* lectin (GNL, known to bind to at least Manα1-3Man) and *Narcissus pseudonarcissus* (NPL, known to bind to at least Manα1-6Man), lectins having a general reactivity with α-L-Fucose, including *Aleuria aurantia* lectin (AAL, known to bind to at least Fucα1-2, -3, -6 linked), *Pisum sativum* agglutinin (PSA, known to bind to at least Fucα1-6GlcNAc of N-linked glycans) and *Ulex europeus* agglutinin-I (UEA, known to bind to at least Fucα1-2Galβ1-4GlcNAc), lectins having a general reactivity with sialic acid, including *Maackia amurensis* agglutinin-II (MAA, known to bind to at least Neu5Acα2-3Galβ1-3 linkages) and *Sambucus nigra* agglutinin (SNA, known to bind to at least Neu5Acα2-6 linkages), and lectins having a general reactivity with complex specificities, including erythroagglutinating phytohemagglutinin (EPHA, known to bind to at least bisecting GlcNAc) and leukoagglutinating phytohemagglutinin (L-PHA, known to bind to at least tri/tetra-antennary β1-6GlcNAc).

Accordingly, the lectin-binding properties of the glycoproteins provided herein indicate the type of glycosylation. For example, an AAL-binding glycoprotein, such as an AAL-binding glycospecies of gelsolin, is a fucosylated type, possibly containing Fucα1-2, -3, -6 linked oligosaccharides, while a NPL-binding glycoprotein, such as a NPL-binding glycospecies of gelsolin, is mannosylated, possibly containing Manα1-6Man oligosaccharides. The identity of the glycans on the glycoprotein biomarkers described herein can be more precisely determined using standard methods well known in the art, such as, for example, mass spectrometry, high-pressure liquid chromatography, nuclear magnetic resonance, correlation spectroscopy, gas-liquid chromatography, or gas chromatography.

As described herein, the levels of the various types of glycosylation present on a single glycoprotein in a sample, such as a blood, serum or plasma sample, from subjects with EAC is different to that of subjects with BE or healthy subjects. Similarly, the levels of several glycospecies of a single glycoprotein as listed above in the serum of subjects with BE is different to that of subjects with EAC or healthy subjects. Accordingly, the glycospecies provided herein are useful as biomarkers in methods for detecting and monitoring the progress of EAC and BE, and related methods and uses.

2.1 Biomarkers that Distinguish Subjects with EAC from Healthy Subjects

Among the glycospecies that are present at different levels in subjects with EAC compared to healthy control subjects are glycospecies of complement component C9, gelsolin, haptoglobin, complement factor B, alpha-1-antichymotrypsin, complement C5, hemopexin, C4b-binding protein alpha chain, plasma protease C1 inhibitor, alpha-1-acid glycoprotein 1, alpha-1-acid glycoprotein 1, ceruloplasmin, antithrombin-III, ficolin-3, and complement C1q subcomponent subunit B. Other markers that are present at different levels in subjects with EAC compared to healthy control subjects are glycospecies of alpha-1-antitrypsin, alpha-1B-glycoprotein, complement C1s subcomponent, complement component C7, alpha-1-acid glycoprotein 2, afamin, fibrinogen gamma chain, retinol-binding protein 4, gelsolin, vitamin K-dependent protein S, insulin-like growth factor-binding protein complex acid labile subunit, N-acetylmuramoyl-L-alanine amidase, fibrogen gamma chain, serotransferrin, haemoglobin subunit beta, haptoglobin, complement factor B, alpha-2-HS-glycoprotein, cadherin-5, haemoglobin subunit beta, apolipoprotein A-I, fibrinogen beta chain, plasma kallikrein, kallistatin, cadherin-5, and centriolin.

Accordingly, a determination of the likelihood of whether a subject has EAC or is healthy and does not have EAC can be made by assessing the level of one or more of these glycospecies in a biological sample from the subject, such as a serum, plasma or blood sample, and comparing it to the level of the same glycoprotein of the same glycosylation type in a corresponding sample from a healthy control subject (i.e. a subject that is known to not have EAC) or samples from multiple healthy control subjects, wherein an increase or decrease indicates that the subject has EAC. In some instances, the level of the glycospecies is compared to a predetermined level or threshold, wherein an increase or decrease in the level of the subject compared to the threshold indicates that the subject has EAC. The predetermined threshold may be calculated based on the level of the same glycospecies in a corresponding sample from a healthy control subject or from a group of healthy subjects, such that a level of the glycospecies above or below the predetermined level indicates that the subject has EAC. In some instances, the ratio of the level of one or more glycospecies to the total level of the glycoprotein is also increased or decreased in a subject with BE compared to a healthy control subject or a group of healthy control subjects, and can thus also be used to determine the presence of EAC. Where two or more types of glycosylation are assessed for a single glycoprotein, a separate ratio for each glycospecies can be determined. Alternatively, a single ratio of the combined levels of the two or more types of glycosylation with a single glycoprotein to the total level of the glycoprotein can be determined.

The glycospecies that are present at different levels in subjects with EAC compared to healthy control subjects are glycospecies of complement component AAL-binding complement component C9, EPHA-binding complement component C9, JAC-binding complement component C9, NPL-binding complement component C9, PSA-binding complement component C9, WGA-binding complement component C9, AAL-binding gelsolin, EPHA-binding gelsolin, JAC-binding gelsolin, PSA-binding gelsolin, EPHA-binding haptoglobin, NPL-binding haptoglobin, PSA-binding haptoglobin, WGA-binding haptoglobin, JAC-binding complement factor B, JAC-binding alpha-1-antichymotrypsin, NPL-binding alpha-1-antichymotrypsin, WGA-binding alpha-1-antichymotrypsin, JAC-binding complement C5, JAC-binding hemopexin, JAC-binding C4b-binding protein alpha chain, NPL-binding C4b-binding protein alpha chain, JAC-binding plasma protease C1 inhibitor, JAC-binding hemopexin, AAL-binding alpha-1-acid glycoprotein 1, EPHA-binding alpha-1-acid glycoprotein 1, JAC-binding ceruloplasmin, NPL-binding ceruloplasmin, NPL-binding antithrombin-III, STL-binding ficolin-3, WGA-binding complement C1q subcomponent subunit B.

Preferably, the individual glycospecies that are differentially expressed between subjects with EAC and healthy subjects in a subject are selected from the glycospecies identified in TABLE 1.

In other embodiments, the individual glycospecies that are differentially expressed between subjects with EAC and healthy subjects in a subject are selected from the glycospecies identified in TABLE 2.

Accordingly, a determination of the likelihood of whether a subject has EAC or is healthy (i.e., is not likely to have EAC) can be made by assessing the level of one or more glycospecies in a biological sample from the subject, such as a serum, plasma or blood sample, and comparing it to the level of the same one or more glycospecies in a corresponding sample from a healthy control subject (i.e. a subject that is known to not have EAC) or samples from multiple healthy control subjects, wherein an increase or decrease indicates that the subject has EAC. In some instances, the level of the one or more glycospecies is compared to a predetermined level or threshold, wherein an increase or decrease in the level of the subject compared to the threshold indicates that the subject has EAC. The predetermined threshold may be calculated based on the level of the same glycospecies in a corresponding sample from a healthy control subject or from a group of healthy subjects, such that a level of the glycospecies above or below the predetermined level indicates that the subject has EAC. In some instances, the ratio of the level of a glycospecies to the total level of the corresponding glycoprotein is also increased or decreased in a subject with EAC compared to a healthy control subject or a group of healthy control subjects, and can thus also be used to determine the likelihood of the presence of EAC. Where two or more glycospecies are assessed for a single glycoprotein, a separate ratio for each glycospecies can be determined. Alternatively, a single ratio of the combined levels of the glycospecies of the single glycoprotein to the total level of the glycoprotein can be determined.

Illustrative glycospecies that have increased levels in subjects with EAC compared to healthy subjects include, for example, those glycospecies identified in TABLE 1 as being overexpressed in subjects with EAC. Thus, a determination that a subject has an increased level of one or more of these types of glycosylation compared to a healthy control subject or compared to a predetermined threshold indicates that the subject has EAC. Similarly, a determination that a subject has an increased ratio of the level of a glycoprotein with one or more types of glycosylation to the total level of the glycoprotein compared to the ratio in a healthy control subject or compared to a predetermined threshold indicates that the subject has EAC.

Illustrative glycospecies that have decreased levels in subjects with EAC compared to healthy subjects include, for example, those glycospecies identified as being underexpressed in subjects with EAC. Thus, a determination that a subject has a decreased level of one or more of these glycospecies compared to a healthy control subject or compared to a predetermined threshold indicates that the subject has EAC. Similarly, a determination that a subject has a decreased ratio of the level of one or more of these glycospecies to the total level of the glycoprotein compared to the ratio in a healthy control subject or compared to a predetermined threshold indicates that the subject has EAC.

The levels or ratios of the glycospecies identified above as being useful biomarkers for EAC can also be used to monitor the progress of disease in a subject that has EAC. For example, the progress of EAC can be assessed or monitored before, during or after treatment by assessing the level or ratio (i.e. the ratio of the level of a glycospecies to the total level of the glycoprotein) of one of more glycospecies in samples taken at various time points. Accordingly, the efficacy of treatment can also be assessed by determining the level or ratio of one or more glycospecies in samples taken at various time points, wherein at least one of those time points is during or after treatment. An increase over time in the level or ratio of one or more of the glycospecies identified above as being increased in subjects with EAC compared to healthy subjects indicates that the disease has progressed, while a decrease in one or more of these glycospecies indicates that the disease has regressed. Conversely, a decrease over time in the level or ratio of one or more of the glycospecies identified above as being decreased in subjects with EAC compared to healthy subjects indicates that the disease has progressed, while an increase in one or more of these glycospecies indicates that the disease has regressed. In instances where the subject has undergone or is undergoing treatment for EAC, progression of the disease may indicate that such treatment has not been effective, while regression of the disease may indicate that such treatment has been at least partially effective.

Accordingly, an increase over time in the level or ratio of one or more of the glycospecies identified in TABLE 1, TABLE 2, or TABLE 3 as being overexpressed in those subjects which are diagnosed with EAC indicates that the subject's EAC has progressed over time, while a decrease of any one or more of these glycospecies indicates that the subject's EAC has regressed.

A decrease over time in the level or ratio of one or more of the glycospecies identified in TABLE 1, TABLE 2, or TABLE 3 as being underexpressed in those subjects diagnosed with EAC indicates that the subject's EAC has progressed over time, while an increase of any one or more of these glycospecies indicates that the subject's EAC has regressed.

In some instances, the level or ratio of more than one type of glycosylation with a single glycoprotein identified above is assessed to determine the presence or progression of EAC in a subject. For example, 2, 3, 4, 5, 6, 7, 8, 9, 10, 15, 20 or more types of glycosylation with a single glycoprotein may be assessed. Thus, a panel of more than one glycospecies may be assessed to determine a glycoprotein's glycosylation profile or signature for a subject. In some embodiments, this profile can be compared to a corresponding profile from a control subject or a group of control subjects to determine the presence or progression of EAC, wherein a change in the profile resulting from increases or decreases in the levels or ratios of the various types of glycosylation for a single glycoprotein, as described above, indicates the presence or progression of EAC.

2.2 Biomarkers that Distinguish Subjects with BE from Healthy Subjects

Among the glycospecies that are present at different levels in subjects with BE compared to healthy control subjects are glycospecies of alpha-2-macroglobulin, apolipoprotein B-100, ficolin-3, complement C1q subcomponent subunit C, protein AMBP, alpha-1-acid glycoprotein 1, coagulation factor XII, antithrombin-III, alpha-2-antiplasmin, and ceruloplasmin.

Additional glycospecies that are present at different levels in subjects with BE compared to healthy control subjects are glycospecies of lumican, prothrombin, fibronectin, apolipoprotein M, angiotensinogen, apolipoprotein A-I, fibrinogen beta chain, plasma kallikrein, histidine-rich glycoprotein, vitamin K-dependent protein S, complement component C8 alpha chain, complement factor H, kallistatin, afamin, and hemoglobin subunit beta.

Accordingly, a determination of whether a subject has BE or is healthy and does not have BE can be made by assessing the level of one or more of these glycospecies in a biological sample from the subject, such as a serum, plasma or blood sample, and comparing it to the level of the same glycoprotein of the same glycosylation type in a corresponding sample from a healthy control subject (i.e. a subject that is known to not have BE) or samples from multiple healthy control subjects, wherein an increase or decrease indicates that the subject has BE. In some instances, the level of the glycospecies is compared to a predetermined level or threshold, wherein an increase or decrease in the level of the subject compared to the threshold indicates that the subject has BE. The predetermined threshold may be calculated based on the level of the same glycospecies in a corresponding sample from a healthy control subject or from a group of healthy subjects, such that a level of the glycospecies above or below the predetermined level indicates that the subject has BE. In some instances, the ratio of the level of one or more glycospecies to the total level of the glycoprotein is also increased or decreased in a subject with BE compared to a healthy control subject or a group of healthy control subjects, and can thus also be used to determine the presence of BE. Where two or more types of glycosylation are assessed for a single glycoprotein, a separate ratio for each glycospecies can be determined. Alternatively, a single ratio of the combined levels of the two or more types of glycosylation with a single glycoprotein to the total level of the glycoprotein can be determined.

The glycospecies that are differentially expressed between healthy subjects and those diagnosed with BE are selected from the group comprising or consisting of: EPHA-binding alpha-2-macroglobulin, JAC-binding apolipoprotein B-100, NPL-binding apolipoprotein B-100, AAL-binding ficolin-3, STL-binding ficolin-3, AAL-binding complement C1q subcomponent subunit C, EPHA-binding protein AMBP, EPHA-binding alpha-1-acid glycoprotein 1, JAC-binding coagulation factor XII, NPL-binding antithrombin-III, SNA-binding alpha-2-antiplasmin, and STL-binding ceruloplasmin.

Preferably, the individual glycospecies (i.e., defined by the glycan-binding molecule (e.g., lectin) and the glycoprotein to which it binds) that are differentially expressed between subjects with BE and healthy subjects are selected from TABLE 4. Thus, a determination that a subject has an increased level of one or more of those glycospecies identified in TABLE 4 or TABLE 5 as being overexpressed as compared to a healthy control subject or compared to a predetermined threshold indicates that the subject has BE. Similarly, a determination that a subject has an increased ratio of the level of one or more of these glycospecies to the total level of the corresponding glycoprotein compared to the ratio in a healthy control subject or compared to a predetermined threshold indicates that the subject has BE.

Illustrative glycospecies that have decreased levels in subjects with BE compared to healthy subjects include, for example, those glycospecies identified in TABLE 4 or TABLE 5 as being underexpressed in subjects diagnosed with BE. Thus, a determination that a subject has a decreased level of one or more of these glycospecies compared to a healthy control subject or compared to a predetermined threshold indicates that the subject has BE. Similarly, a determination that a subject has a decreased ratio of the level of one or more of those glycospecies to the total level of the corresponding glycoprotein compared to the ratio in a healthy control subject or compared to a predetermined threshold indicates that the subject has BE.

The levels or ratios of the glycospecies of one or more glycoproteins identified above as being useful biomarkers for BE can also be used to monitor the progress of disease in a subject that has BE. For example, the progress of BE can be assessed or monitored before, during or after treatment by assessing the level or ratio (i.e. the ratio of the level of a glycospecies to the total level of the glycoprotein) of one of more of the glycospecies in samples taken at various time points. Accordingly, the efficacy of treatment can also be assessed by determining the level or ratio of one of more of the glycospecies in samples taken at various time points, wherein at least one of those time points is during or after treatment. An increase over time in the level or ratio of one or more of the glycospecies identified above as being increased in subjects with BE compared to healthy subjects indicates that the disease has progressed, while a decrease in one or more of these glycospecies indicates that the disease has regressed. Conversely, a decrease over time in the level or ratio of one or more of the glycospecies identified above as being decreased in subjects with BE compared to healthy subjects indicates that the disease has progressed, while an increase in one or more of these glycospecies indicates that the disease has regressed. In instances where the subject has undergone or is undergoing treatment for BE, progression of the disease may indicate that such treatment has not been effective, while regression of the disease may indicate that such treatment has been at least partially effective.

Accordingly, an increase over time in the level or ratio of one or more of those glycospecies identified in TABLE 4 or TABLE 5 as being overexpressed in a subject diagnosed with BE indicates that the subject's BE has progressed over time, while a decrease of any one or more of these glycospecies indicates that the subject's BE has regressed.

A decrease over time in the level or ratio of alpha-2-macroglobulin in a subject with BE indicates that the subject's BE has progressed over time, while an increase of this glycospecies indicates that the subject's BE has regressed.

In some instances, the level or ratio of more than one glycospecies identified above is assessed to determine the presence or progression of BE in a subject. For example, 2, 3, 4, 5, 6, 7, 8, 9, 10, 15, 20 or more glycospecies may be assessed. Thus, a panel of glycospecies may be assessed to determine a glycospecies profile or signature for a subject. In some embodiments, this profile can be compared to a corresponding profile from a control subject or a group of control subjects to determine the presence or progression of BE, wherein a change in the profile resulting from increases or decreases in the levels or ratios of the various glycospecies, as described above, indicates the presence or progression of BE.

2.3 Biomarkers that Distinguish Subjects with EAC from Subjects with BE

Among the glycospecies that are present at different levels in a biological sample from a subject with EAC compared to subjects with BE are glycospecies of haptoglobin, alpha-1-antichymotrypsin, complement component C9, complement factor B, complement C5, hemopexin, C4b-binding protein alpha chain, plasma protease C1 inhibitor, gelsolin, alpha-2-macroglobulin, alpha-2-HS-glycoprotein, ficolin-3, complement C1q subcomponent subunit C, alpha-1-acid glycoprotein 1, ceruloplasmin, coagulation factor XII, and alpha-2-antiplasmin. Additional glycospecies that are present at different levels in a biological sample from a subject with EAC compared to subjects with BE are glycospecies of prothrombin, hemopexin, alpha-1B-glycoprotein, complement factor I, complement factor H, complement C1s subcomponent, C4b-binding protein beta chain, Inter-alpha-trypsin inhibitor heavy chain H4, retinol-binding protein 4, beta-2-glycoprotein 1, lumican, and serum paraoxonase/lactonase 3.

Accordingly, a determination of whether a subject has EAC can be made by assessing the level of one or more of these glycospecies in a biological sample, such as a serum, plasma or blood sample, from the subject, and comparing it to the level of the same glycospecies in a corresponding sample from a control subject with BE or from multiple control subjects, wherein an increase or decrease indicates that the subject has EAC. In some instances, the abundance or level of the glycospecies is compared to a predetermined threshold, wherein an increase or decrease indicates that the subject has EAC. The predetermined threshold is determined based on the level of the same glycospecies in a corresponding sample from a control subject with BE or from a group of control subjects with BE, such that a level of the glycospecies in the sample from the subject above or below the predetermined level indicates that the subject has EAC. In some instances, the ratio of the level of one or more glycospecies of a glycoprotein to the total level of the glycoprotein is also increased or decreased in a subject with EAC compared to a control subject with BE or a group of control subjects with BE. Where two or more glycospecies of the same glycoprotein are assessed, a separate ratio for each glycospecies can be determined. Alternatively, a single ratio of the combined levels of the two or more glycospecies of the glycoprotein to the total level of the glycoprotein can be determined.

Among the glycospecies that are present at different levels in subjects with EAC compared to subjects with BE are glycospecies of AAL-binding complement component C9, EPHA-binding complement component C9, WGA-binding complement component C9, JAC-binding complement component C9, NPL-binding complement component C9, PSA-binding complement component C9, AAL-binding gelsolin, EPHA-binding gelsolin, JAC-binding gelsolin, PSA-binding gelsolin, NPL-binding gelsolin, WGA-binding gelsolin, AAL-binding haptoglobin, EPHA-binding haptoglobin, JAC-binding haptoglobin, PSA-binding haptoglobin, WGA-binding haptoglobin, JAC-binding complement factor B, EPHA-binding alpha-1-antichymotrypsin, PSA-binding alpha-1-antichymotrypsin, JAC-binding alpha-1-antichymotrypsin, AAL-binding complement C5, JAC-binding complement C5, PSA-binding complement C5, AAL-binding complement component C7, PSA-binding complement component C7, EPHA-binding complement component C7, JAC-binding complement component C7, AAL-binding apolipoprotein B-100, NPL-binding apolipoprotein B-100, EPHA-binding serotransferrin, JAC-binding alpha-1-antitrypsin, JAC-binding alpha-1B-glycoprotein, AAL-binding alpha-1-acid glycoprotein 1, AAL-binding ficolin-3, AAL-binding complement C1q subcomponent subunit C, AAL-binding alpha-1-acid glycoprotein 1, JAC-binding ceruloplasmin, STL-binding ceruloplasmin, JAC-binding coagulation factor XII, and SNA-binding alpha-2-antiplasmin.

Preferably, the individual glycospecies (i.e., defined by the glycan-binding molecule (e.g., lectin) and the glycoprotein to which it binds) that are differentially expressed between EAC and BE are selected from TABLE 6.

In other embodiments, the individual glycospecies (i.e., defined by the glycan-binding molecule (e.g., lectin) and the glycoprotein to which it binds) that are differentially expressed between EAC and BE are selected from TABLE 7.

Thus, a determination that a subject has a decreased level of one or more of these glycospecies compared to a control subject with BE or compared to a predetermined threshold indicates that the subject has EAC. Similarly, a determination that a subject has a decreased ratio of the level of one or more of these glycospecies of a glycoprotein to the total level of the glycoprotein compared to the ratio in a control subject with BE or compared to a predetermined threshold indicates that the subject has EAC.

In particular examples, the levels of different glycospecies of gelsolin are assessed to determine whether a subject has EAC. As indicated above, the levels of multiple glycospecies of gelsolin are reduced in EAC subjects compared to BE subjects, as set out in TABLE 6 or TABLE 7. These isoforms of gelsolin include AAL-binding gelsolin, JAC-binding gelsolin, and PSA-binding gelsolin, and comparing the level to the level of the same type of glycosylation of gelsolin in a control subject with BE or to a predetermined threshold, wherein a decrease indicates that the subject has EAC.

In further examples, the ratio of the level of one or more glycospecies of gelsolin to the total gelsolin level in a sample from a subject is assessed to determine whether the subject has EAC. Thus, in some examples, the methods of the present invention include determining the level of a gelsolin glycospecies selected from the group consisting of AAL-binding gelsolin, JAC-binding gelsolin and PSA-binding gelsolin, in a sample from a subject and also determining the total gelsolin levels in the same sample. A ratio of the level of the gelsolin with a single type of glycosylation to the total gelsolin level is then determined and compared to the same ratio as determined for a control subject with BE or is compared to a predetermined threshold. A decrease in the ratio in the subject compared to the control subject or predetermined threshold indicates that the subject has EAC. In some instances, the level of two or more types of glycosylation of gelsolin, such as two or more of AAL-binding gelsolin, JAC-binding gelsolin and PSA-binding gelsolin, are measured so as to determine a ratio of the combined level of the two or more types of glycosylation of gelsolin to the total level of gelsolin. This ratio is then compared to the same ratio as determined for a control subject with BE or is compared to a predetermined threshold, wherein a decrease in the ratio in the subject compared to the control subject or predetermined threshold indicates that the subject has EAC.

The levels or ratios of the glycospecies identified above as being useful biomarkers for EAC can also be used to monitor the progress of disease in a subject that has EAC. For example, the progress of EAC can be assessed or monitored before, during or after treatment by assessing the level or ratio (i.e. the ratio of the level of a glycospecies of a glycoprotein to the total level of the glycoprotein) of one of more of the glycospecies in samples taken at various time points. Accordingly, the efficacy of treatment can also be assessed by determining the level or ratio of one of more of the glycospecies in samples taken at various time points, wherein at least one of those time points is during or after treatment. An increase over time in the level or ratio of one or more of the glycospecies identified above as being increased in subjects with EAC compared to BE or a healthy sample indicates that the disease has progressed, while a decrease in one or more of these glycospecies indicates that the disease has regressed. Conversely, a decrease over time in the level or ratio of one or more of the glycospecies identified above as being decreased in subjects with EAC compared to BE or a healthy sample indicates that the disease has progressed, while an increase in one or more of these glycospecies indicates that the disease has regressed. In instances where the subject has undergone or is undergoing treatment for EAC, progression of the disease may indicate that such treatment has not been effective, while regression of the disease may indicate that such treatment has been at least partially effective.

Therefore, an increase over time in the level or ratio of one or more of glycospecies of glycoprotein selected from those identified in TABLE 6 or TABLE 7 as being overexpressed in a subject with EAC compared with a subject with BE, in a subject diagnosed with EAC indicates that the subject's EAC has progressed over time, while a decrease of any one or more of these glycospecies indicates that the subject's EAC has regressed.

A decrease over time in the level or ratio of one or more those glycospecies of glycoprotein that are identified in TABLE 6 or TABLE 7 as being underexpressed in a subject with EAC compared to a subject with BE, in a subject diagnosed with EAC indicates that the subject's EAC has progressed over time, while an increase of any one or more of these glycospecies indicates that the subject's EAC has regressed.

In some instances, the level or ratio of more than one glycospecies identified above is assessed to determine the presence or progression of EAC in a subject. For example, 2, 3, 4, 5, 6, 7, 8, 9, 10, 15, 20 or more glycospecies may be assessed. Thus, a panel of glycospecies may be assessed to determine a "glycoprotein profile" for a subject. In some embodiments, this profile can be compared to a corresponding profile from a control subject or a group of control subjects to determine the presence or progression of EAC, wherein a change in the profile resulting from increases or decreases in the levels or ratios of the various glycospecies, as described above, indicates the presence or progression of EAC.

3. Methods for Assessing the Levels of Biomarkers

The levels of glycospecies identified herein as being useful biomarkers for detecting the likelihood of the presence or absence of, or monitoring the progress of, EAC and BE, can be assessed by any method known in the art. Such methods include, but are not limited to, methods that detect binding of a glycospecies to a glycan-binding molecule, such as a lectin, glycospecific antibody or glycospecific aptamer that is selective and/or specific for the glycospecies, such as western blots, ELISAs and microarray-based techniques. Spectroscopic methods also can be used to assess the level of a glycospecies in a sample.

The level of one or more glycospecies as described herein is assessed in a biological sample from a subject. Most typically, the biological sample is a blood, serum, plasma or blood fraction sample, although other types of samples are contemplated. The sample may be obtained from the subject before or after diagnosis of BE or EAC. For example, in the methods of the present invention that are used to detect BE or EAC, the sample may be obtained from a subject before or after that subject has been diagnosed with having or having had BE or EAC. In the methods of the present invention that are used to monitor the progress of disease, the sample is obtained from the subject after they have been diagnosed with having or having had BE or EAC. For example, in some instances, the subject has been diagnosed with BE or EAC, then been assessed as having cleared the disease before the sample is taken to assess the levels of one or more glycospecies. In instances where the subject has been diagnosed as having or having had BE or EAC, the subject may have undergone or be undergoing treatment, such as surgical or medical treatment. One or more samples can be taken from the subject at one or more time points. For example, to monitor the progress of disease, at least two samples are taken at two different time points, so as to compare the levels of one or more glycoproteins over time. In particular examples, 2, 3, 4, 5, 6, 7, 8, 9, 10 or more samples are taken from the subject over a period of days, weeks, months or years.

In particular embodiments of the methods of the invention, the level of a glycospecies is assessed by detecting the binding of the glycospecies to an appropriate glycan-binding molecule. In one example, the glycan-binding molecule is a lectin. Lectins are proteins or glycoproteins that bind to all or part of a glycan structure. A lectin may bind to a specific glycan moiety that is part of a glycoprotein or another glycan-containing molecule such as a glycolipid, glycophosphatidylinositol or glycosaminoglycan. Lectins are capable of binding to specific glycans. Advantageously, the high specificity of a lectin for a particular glycan moiety facilitates the precipitation, isolation and/or detection of glycoproteins with a particular single types of glycosylation from or in a biological sample by specifically binding to those types of glycosylation.

Lectins useful for binding glycospecies of glycoprotein are described herein so as to determine the levels of the glycospecies in a sample include *Bauhinia purpurea* lectin (BPL), *Erythrina cristagalli* agglutinin (ECA), jacalin (JAC), soybean agglutinin (SBA), *Helix pomatia* agglutinin (HPA), *Wisteria floribunda* agglutinin (WFA), *Datura stramonium* lectin (DSA), *Helix aspersa* agglutinin (HAA), *Solanum tuberosum* lectin (STL), wheat germ agglutinin (WGA), concanavalin A (ConA), *Galanthus nivalis* lectin (GNL), *Narcissus pseudonarcissus* lectin (NPL), *Aleuria aurantia* lectin (AAL), *Pisum sativum* agglutinin (PSA), (*Ilex europeus* agglutinin-I (UEA), *Maackia amurensis* agglutinin-II (MAA), *Sambucus nigra* agglutinin (SNA), erythroagglutinating phytohemagglutinin (E-PHA), and leukoagglutinating phytohemagglutinin (L-PHA). For example, AAL can be used to detect the levels of any AAL-binding glycoprotein, such as AAL-gelsolin and AAL-binding complement component C9. Similarly, PSA can be used to detect the levels of any PSA-binding glycoprotein, including, but not limited to, PSA-binding complement C5 and PSA-binding retinol-binding protein 4.

Assays and techniques to detect binding of a glycospecies to a lectin are well known in the art, and any such assay or technique can be used in the methods of the present invention. In one example, lectin-magnetic bead array-coupled mass spectrometry (LeMBA-MS), as described by Choi et al. (Electrophoresis (2011) 32, 3564-3575) and also below in Example 1, is used. In other examples, immunoassays that utilise lectin to capture the glycoprotein with a single glycosylation and a glycoprotein-specific antibody to detect and quantify the captured glycoprotein are used. Such assays include, for example, western blots, ELISAs, lectin-AlphaLISA assays, and immunofluorescence. For example, lectin-based ELISAs (or lectin-based immunosorbant assays (LIAs)) may involve coating a surface, such as a multiwell plate, with an antibody specific for the polypeptide backbone of the glycoprotein, then adding the biological sample containing the glycoprotein to form an immobilised complex. The complex is then contacted with the appropriate biotinylated lectin and detected using streptavidin. In other example, the plate is coated with lectin and the biological sample is added to form lectin-glycoprotein complexes, which are then detected using antibodies specific for the polypeptide backbone of the glycoprotein. These types of techniques are amenable to modification for use in clinical and diagnostic applications that require high sensitivity and accuracy with relatively low cost. For example, automated analyzers based on liquid-phase binding can be used to detect and quantify specific glycoproteins in a biological sample, such as a serum sample. Choi et al. (Clinica Chimica Acta (2012) 413:170-174) and Kagebayashi et al. (Anal Biochem (2009) 388:306-311) describe the use of the micro-total analysis systems (µTAS) immunoassays, performed using fully automated instruments such as the µTASWako® i30 Immunoanalyzer (Wako Pure Chemicals Industries, Ltd) to detect and quantify an LCA-binding glycoprotein of alpha-fetoprotein, and such systems are readily adaptable to detect and quantify the glycoproteins described herein.

Techniques involving the use of electrochemical sensors are also suitable for use in the methods of the invention to assess levels of a glycospecies in a sample by binding the glycospecies to a lectin. Electrochemical sensors include a biorecognition element, such as a lectin, coupled to an electrode transducer surface. The specific interaction of a biological sample containing, for example, a glycospecies, to its corresponding lectin on the electrode surface is detected by electrical current or potential changes occurring at the transducer/biomolecule interface. This type of technique is described by Shah, A. K., Electrochemical detection of glycan and protein epitopes of glycoproteins in serum, *Analyst*, 2014, 139(22): 5970-6, and is particularly suited to point of care applications.

Thus, the present invention is also directed to the use of lectins and compositions comprising lectins to detect the levels of one or more glycospecies in a biological sample, and thus uses of lectins to determine the likelihood of the presence or absence of, or monitor the progress of, EAC or BE in subject. For example, provided are uses of a lectin to determine the level of one or more glycospecies in a sample, comprising contacting the sample with the lectin under conditions that permit binding of the glycospecies to the lectin, and detecting and determining the level of the glycospecies in the sample, wherein a level of the glycospecies above or below a predetermined threshold indicates the presence of EAC or BE, as described above in section 2. Similarly, lectins can be used to determine the ratio of the level of a glycospecies in a sample to the total level of the glycoprotein, as described above, wherein a ratio of the glycospecies above or below a predetermined threshold indicates the presence of EAC or BE, as described above in section 2.

In some of the methods of the present invention, a ratio of the level of a glycospecies to the total level of the glycoprotein (i.e. the combined level of all types or glycosylation of the glycoprotein) in a sample is determined. Thus, the methods of the present invention may also require assessing the total level of a glycoprotein in a sample. Any method for determining the level of a glycoprotein, such as the concentration or amount of a glycoprotein, in a samples can be used, and such methods are widely known to those of skill in the art. Exemplary methods include, but are not limited to, immunoassays that utilise glycoprotein-specific antibodies to capture the glycoproteins and a secondary antibody to detect and quantify the captured glycoprotein. Such assays include, for example, western blots, ELISAs and immunofluorescence. The µTAS immunoassays described above are also suitable for detecting and quantifying levels of a glycoprotein, as are techniques involving the use of electrochemical sensors, as described above. In some embodiments, the detection and quantitation of the glycoprotein is performed simultaneously with, and using the same platform, as detection and quantitation of the glycospecies. For example, the levels of a particular glycospecies and the total levels of the glycoprotein can be simultaneously assessed using the µTAS immunoassays referred to above and described by Choi et al. (Clinica Chimica Acta (2012) 413:170-174) and Kagebayashi et al. (Anal Biochem (2009) 388:306-311).

A glycospecies may be determined to be a multivariate marker, i.e., differentially expressed in a variety of ways, for example, between subjects or group of subjects with different conditions if the presence or absence or mean or median level or concentration of the glycospecies in the different subjects or group of subjects is calculated to be statistically significant. Common tests for statistical significance include, among others, t-test, ANOVA, Kruskal-Wallis, Wilcoxon, Mann-Whitney and odds ratio.

4. Kits

All of the essential materials and reagents required for detecting and determining the levels of one or more glycospecies described herein may be assembled together in a kit. The kits may also optionally include appropriate reagents for detection of labels, positive and negative controls, washing solutions, blotting membranes, microtiter plates dilution buffers and the like. For example, a lectin-binding immunosorbent assay may include a lectin specific for the glycospecies of the glycoprotein to be detected, an antibody specific for the glycoprotein (i.e. specific for the polypeptide backbone of the glycosylation), and optionally a glycospecies, which may be used as a positive control. Also included may be buffers, wash solutions or blocking reagents, and enzymes and/or substrates for detection of labels. The kit can also feature various devices and reagents for performing one of the assays described herein, and/or printed instructions for using the kit to determine the level of a glycoprotein.

5. Therapeutic Applications

The present invention also extends to the management and treatment of subjects with BE or EAC. For example, where the methods of the present invention are used to detect the presence of EAC or BE in a subject, the methods can further comprise treating the EAC or BE. Therapies for EAC and BE are well known in the art and an appropriate therapeutic regimen for a particular subject, based on the severity of the disease and other factors, such as age and general health of the subject, can be determined by a skilled practitioner and administered appropriately without undue experimentation.

Treatment for BE may include, for example, changes to diet and exercise, administration of therapeutic agents to reduce acid reflux, including proton pump inhibitors, antacids or H2 blockers, photodynamic therapy (PDT) and endoscopic mucosal resection (EMR). Treatment options for EAC can vary depending on the stage of the cancer, i.e. stage 1, 2, 3, 4 or 5, and can include surgery to remove the part of their esophagus that contains the cancer (esophagectomy), chemotherapy, immunotherapies and/or radiation therapy.

Radiotherapies include radiation and waves that induce DNA damage for example, γ-irradiation, X-rays, UV irradiation, microwaves, electronic emissions, radioisotopes, and the like. Therapy may be achieved by irradiating the localized tumor site with the above described forms of radiations. It is most likely that all of these factors effect a broad range of damage DNA, on the precursors of DNA, the replication and repair of DNA, and the assembly and maintenance of chromosomes.

Dosage ranges for X-rays range from daily doses of 50 to 200 roentgens for prolonged periods of time (3 to 4 weeks), to single doses of 2000 to 6000 roentgens. Dosage ranges for radioisotopes vary widely, and depend on the half life of the isotope, the strength and type of radiation emitted, and the uptake by the neoplastic cells.

Non-limiting examples of radiotherapies include conformal external beam radiotherapy (50-100 Grey given as fractions over 4-8 weeks), either single shot or fractionated, high dose rate brachytherapy, permanent interstitial brachytherapy, systemic radio-isotopes (e.g., Strontium 89). In some embodiments the radiotherapy may be administered in combination with a radiosensitizing agent. Illustrative examples of radiosensitizing agents include but are not limited to efaproxiral, etanidazole, fluosol, misonidazole, nimorazole, temoporfin and tirapazamine.

Chemotherapeutic agents may be selected from any one or more of the following categories:

- (i) antiproliferative/antineoplastic drugs and combinations thereof, as used in medical oncology, such as alkylating agents (for example cis-platin, carboplatin, cyclophosphamide, nitrogen mustard, melphalan, chlorambucil, busulphan and nitrosoureas), antimetabolites (for example antifolates such as fluoropyrimidines like 5-fluorouracil and tegafur, raltitrexed, methotrexate, cytosine arabinoside and hydroxyurea, antitumor antibiotics (for example anthracyclines like adriamycin, bleomycin, doxorubicin, daunomycin, epirubicin, idarubicin, mitomycin-C, dactinomycin and mithramycin), antimitotic agents (for example *vinca* alkaloids like vincristine, vinblastine, vindesine and vinorelbine and taxoids like paclitaxel and docetaxel, and topoisomerase inhibitors (for example epipodophyllotoxins like etoposide and teniposide, amsacrine, topotecan and camptothecin);
- (ii) cytostatic agents such as antiestrogens (for example tamoxifen, toremifene, raloxifene, droloxifene and idoxifene), oestrogen receptor down regulators (for example fulvestrant), antiandrogens (for example bicalutamide, flutamide, nilutamide and cyproterone acetate), UH antagonists or LHRH agonists (for example goserelin, leuprorelin and buserelin), progestogens (for example megestrol acetate), aromatase inhibitors (for example as anastrozole, letrozole, vorozole and exemestane) and inhibitors of 5α-reductase such as finasteride;
- (iii) agents which inhibit cancer cell invasion (for example metalloproteinase inhibitors like marimastat and inhibitors of urokinase plasminogen activator receptor function);
- (iv) inhibitors of growth factor function, for example such inhibitors include growth factor antibodies, growth factor receptor antibodies (for example the anti-erbb2 antibody trastuzumab [Herceptin™] and the anti-erbb1 antibody cetuximab [C225]), farnesyl transferase inhibitors, MEK inhibitors, tyrosine kinase inhibitors and serine/threonine kinase inhibitors, for example other inhibitors of the epidermal growth factor family (for example other EGFR family tyrosine kinase inhibitors such as N-(3-chloro-4-fluorophenyl)-7-methoxy-6-(3-morpholinopropoxy)quinazolin-4-amine (gefitinib, AZD1839), N-(3-ethynylphenyl)-6,7-bis(2-methoxyethoxy)quinazolin-4-amine (erlotinib, OSI-774) and 6-acrylamido-N-(3-chloro-4-fluorophenyl)-7-(3-morpholinopropoxy)quinazoli-n-4-amine (CI 1033)), for example inhibitors of the platelet-derived growth factor family and for example inhibitors of the hepatocyte growth factor family;
- (v) anti-angiogenic agents such as those which inhibit the effects of vascular endothelial growth factor, (for example the anti-vascular endothelial cell growth factor antibody bevacizumab [Avastin™], compounds such as those disclosed in International Patent Applications WO 97/22596, WO 97/30035, WO 97/32856 and WO 98/13354) and compounds that work by other mechanisms (for example linomide, inhibitors of integrin αvβ3 function and angiostatin);

(vi) vascular damaging agents such as Combretastatin A4 and compounds disclosed in International Patent Applications WO 99/02166, WO00/40529, WO 00/41669, WO01/92224, WO02/04434 and WO02/08213;

(vii) antisense therapies, for example those which are directed to the targets listed above, such as ISIS 2503, an anti-ras antisense, and (viii) gene therapy approaches, including for example approaches to replace aberrant genes such as aberrant p53 or aberrant GDEPT (gene-directed enzyme pro-drug therapy) approaches such as those using cytosine deaminase, thymidine kinase or a bacterial nitroreductase enzyme and approaches to increase patient tolerance to chemotherapy or radiotherapy such as multi-drug resistance gene therapy.

Immunotherapy approaches, include for example ex-vivo and in-vivo approaches to increase the immunogenicity of patient tumor cells, such as transfection with cytokines such as interleukin 2, interleukin 4 or granulocyte-macrophage colony stimulating factor, approaches to decrease T-cell anergy, approaches using transfected immune cells such as cytokine-transfected dendritic cells, approaches using cytokine-transfected tumor cell lines and approaches using anti-idiotypic antibodies. These approaches generally rely on the use of immune effector cells and molecules to target and destroy cancer cells. The immune effector may be, for example, an antibody specific for some marker on the surface of a malignant cell. The antibody alone may serve as an effector of therapy or it may recruit other cells to actually facilitate cell killing. The antibody also may be conjugated to a drug or toxin (chemotherapeutic, radionuclide, ricin A chain, cholera toxin, pertussis toxin, etc.) and serve merely as a targeting agent. Alternatively, the effector may be a lymphocyte carrying a surface molecule that interacts, either directly or indirectly, with a malignant cell target. Various effector cells include cytotoxic T cells and NK cells.

Examples of other cancer therapies include phototherapy, cryotherapy, toxin therapy or pro-apoptosis therapy. One of skill in the art would know that this list is not exhaustive of the types of treatment modalities available for cancer and other hyperplastic lesions.

In instances where the cancer is HER2-positive, treatment may also include administration of an anti-HER2 antibody, such as trastuzumab.

Where the methods of the present invention are used to monitor the progress of EAC or BE in a subject that has undergone or is undergoing treatment, and/or assess the efficacy of treatment, the methods may also include modifying or altering the treatment. For example, if the level or ratio of one or more glycospecies identified herein indicates that the disease has progressed and the current or previous treatment protocol has been ineffective, a skilled practitioner may devise a modified or altered treatment protocol. For example, if the subject has undergone surgery to remove part of the esophagus, and the level or ratio of one or more glycospecies identified herein indicates that the disease has progressed post-surgery, the subject may be administered chemotherapy and/or radiotherapy. Conversely, if the level or ratio of one or more glycospecies identified herein indicates that the disease has regressed and the current or previous treatment protocol has been effective, a skilled practitioner may continue the current or previous treatment protocol to continue regression of the disease, or may choose to reduce or discontinue the current or previous treatment protocol. Further, the methods of the present invention can also be used to determine the likelihood of a subject who has undergone a treatment regimen (e.g., surgery) having a relapse of EAC or BE. Preferably, the subject would be monitored at a time after the treatment regimen (e.g., after 1 day, 2 days, 3 days, 4 days, 5 days, 6 days, 1 week, 2 weeks, 3 weeks, 1 month, 2 months, 3 months, 4 months 6 months or more than 6 months) to determine the likelihood of the subject having a relapse of EAC or BE.

Typically, therapeutic agents as described for example above will be administered in pharmaceutical compositions together with a pharmaceutically acceptable carrier and in an effective amount to achieve their intended purpose. The dose of active compounds administered to a subject should be sufficient to achieve a beneficial response in the subject over time such as a reduction in, or relief from, the symptoms of EAC or BE. The quantity of the pharmaceutically active compounds(s) to be administered may depend on the subject to be treated inclusive of the age, sex, weight and general health condition thereof. In this regard, precise amounts of the active compound(s) for administration will depend on the judgment of the practitioner.

6. Methods of Monitoring Treatment

The present invention can be practiced in the field of predictive medicine for the purposes of diagnosis or monitoring the presence or development of a condition selected from EAC or BE in a subject, and/or monitoring response to therapy efficacy.

The glycospecies profiles of the present invention further enable determination of endpoints in pharmacotranslational studies. For example, clinical trials can take many months or even years to establish the pharmacological parameters for a medicament to be used in treating or preventing EAC or BE. However, these parameters may be associated with a glycospecies profile associated with a health state (e.g., HC). Hence, the clinical trial can be expedited by selecting a treatment regimen (e.g., medicament and pharmaceutical parameters), which results in a glycospecies profile associated with the desired health state (e.g., HC). This may be determined for example by (1) providing a correlation of a reference glycospecies profile with the likelihood of having HC, (2) obtaining a corresponding glycospecies profile of a subject having EAC or BE, after treatment with a treatment regimen, wherein a similarity of the subject's glycospecies profile after treatment to the reference glycospecies profile indicates the likelihood that the treatment regimen is effective for changing the health status of the subject to the desired health state (e.g., HC). This aspect of the present invention advantageously provides methods of monitoring the efficacy of a particular treatment regimen in a subject (for example, in the context of a clinical trial) already diagnosed with a condition selected from EAC or BE. These methods take advantage of glycospecies biomarkers that correlate with treatment efficacy, for example, to determine whether the glycospecies profile of a subject undergoing treatment partially or completely normalizes during the course of or following therapy or otherwise shows changes associated with responsiveness to the therapy.

The glycospecies profiles further enable stratification of patients prior to enrolment in pharmacotranslational studies. For example, a clinical trial can be expedited by selecting a priori patients with a particular glycospecies profile that would most benefit from a particular treatment regimen (e.g., medicament and pharmaceutical parameters). For instance, patient enrolment into a clinical trial testing the efficacy of a new EAC cancer therapeutic would best include patients with a glycospecies profile that indicated that they had EAC rather than BE, and as such the selected patients would most likely benefit from the new therapy.

Thus, the invention provides methods of correlating a reference glycospecies profile with an effective treatment regimen for a condition selected from EAC or BE, wherein the reference glycospecies profile evaluates at least one (e.g., 1, 2, 3, 4, 5, 6, 7, 8, 9, 10, etc.) glycospecies biomarker. These methods generally comprise: (a) determining a sample glycospecies profile from a subject with the condition prior to treatment (i.e., baseline), wherein the sample glycospecies profile evaluates for an individual glycospecies biomarker in the reference glycospecies profile a corresponding glycospecies biomarker, and correlating the sample glycospecies profile with a treatment regimen that is effective for treating that condition.

The invention further provides methods of determining whether a treatment regimen is effective for treating a subject with a condition selected from EAC or BE. These methods generally comprise: (a) correlating a reference glycospecies profile prior to treatment (i.e., baseline) with an effective treatment regimen for the condition, wherein the reference glycospecies profile evaluates at least one (e.g., 1, 2, 3, 4, 5, 6, 7, 8, 9, 10, etc.) glycospecies biomarker, and (b) obtaining a sample glycospecies profile from the subject after treatment, wherein the sample glycospecies profile evaluates for an individual glycospecies biomarker in the reference glycospecies profile a corresponding glycospecies biomarker, and wherein the sample glycospecies profile after treatment indicates whether the treatment regimen is effective for treating the condition in the subject.

The invention can also be practiced to evaluate whether a subject is responder (i.e., a positive response) or non-responder (i.e., no response) to a treatment regimen. This aspect of the invention provides methods of correlating a glycospecies profile with a positive and/or negative response to a treatment regimen. These methods generally comprise: (a) obtaining an glycospecies profile from a subject with a condition selected from EAC or BE following commencement of the treatment regimen, wherein the glycospecies profile evaluates at least one (e.g., 1, 2, 3, 4, 5, 6, 7, 8, 9, 10, etc.) glycospecies biomarker, and (b) correlating the glycospecies from the subject with a positive and/or negative response to the treatment regimen.

The invention also provides methods of determining a positive and/or negative response to a treatment regimen by a subject with a condition selected from EAC or BE. These methods generally comprise: (a) correlating a reference glycospecies profile with a positive and/or negative response to the treatment regimen, wherein the reference glycospecies profile evaluates at least one (e.g., 1, 2, 3, 4, 5, 6, 7, 8, 9, 10, etc.) glycospecies biomarker, and (b) determining a sample glycospecies profile from the subject, wherein the subject's sample glycospecies profile evaluates for an individual glycospecies biomarker in the reference glycospecies profile a corresponding glycospecies biomarker and indicates whether the subject is responding to the treatment regimen.

In some embodiments, the methods further comprise determining a first sample glycospecies profile from the subject prior to commencing the treatment regimen (i.e., a baseline profile), wherein the first sample glycospecies profile evaluates at least one (e.g., 1, 2, 3, 4, 5, 6, 7, 8, 9, 10, etc.) glycospecies biomarker, and comparing the first sample glycospecies profile with a second sample glycospecies profile from the subject after commencement of the treatment regimen, wherein the second sample glycospecies profile evaluates for an individual glycospecies biomarker in the first sample glycospecies profile a corresponding glycospecies biomarker. This aspect of the invention can be practiced to identify responders or non-responders relatively early in the treatment process, i.e., before clinical manifestations of efficacy. In this way, the treatment regimen can optionally be discontinued, a different treatment protocol can be implemented and/or supplemental therapy can be administered. Thus, in some embodiments, a sample glycospecies profile is obtained within about 2 hours, 4 hours, 6 hours, 12 hours, 1 day, 2 days, 3 days, 4 days, 5 days, 1 week, 2 weeks, 3 weeks, 4 weeks, 6 weeks, 8 weeks, 10 weeks, 12 weeks, 4 months, six months or longer of commencing therapy.

In order that the invention may be readily understood and put into practical effect, particular preferred embodiments will now be described by way of the following non-limiting examples.

EXAMPLES

Example 1

Identification of Biomarkers for EAC

To identify biomarkers for EAC and BE, the abundance of proteins with altered glycosylation structures (i.e. different glycospecies) in the serum of healthy patients, patients with BE and patients with EAC was assessed using lectin-magnetic bead array-coupled mass spectrometry (LeMBA-MS) essentially as described by Choi et al. (Electrophoresis (2011) 32, 3564-3575). A schematic of the biomarker identification protocol is shown in FIG. 1.

Materials and Methods

Sample Preparation

In the discovery phase, 29 serum samples (TABLE 8), consisting of 10 each of BE, EAC and 9 healthy controls (4 confirmed BE-free from Study of Digestive Health and 6 population controls from Australian Cancer Study), were analysed. One of the control patients subsequently developed BE, so the data were excluded from further analysis. All of the patients were male, reflecting the male-dominance of EAC and BE.

The serum samples were denatured by heating in denaturing buffer (20 mM Tris-HCl pH 7.4, 1% w/v SDS, 5% v/v Triton X-100 and 20 mM dithiothreitol (DTT) at 60° C. for 30 minutes, followed by alkylation with 100 mM iodoacetamide for 1 hr at 37° C., maintaining a dark condition, prior to dilution for lectin pulldown. 50 µg alkylated serum sample per reaction was incubated with lectin conjugated beads in 100 µl binding buffer (20 mM Tris-HCl pH 7.4, 300 mM NaCl, 1 mM $CaCl_2$), 1 mM $MnCl_2$, 0.05% w/v SDS, 1% v/v Triton X-100) at 4° C. for 1 hour on a plate shaker.

Following the glycoprotein capture, beads were washed three times with binding buffer, seven times with 50 mM ammonium bicarbonate with three changes of plates during wash steps. 0.95 µg of sequencing grade trypsin in 20 µl of 50 mM ammonium bicarbonate was added to each reaction mixture and incubated at 37° C. overnight for on-bead trypsin digest. On the following day, digested peptides were transferred to a new plate. Beads were washed with equivalent volume of 50 mM ammonium bicarbonate and supernatant was combined with digested peptides. Pooled peptide samples were dried under the vacuum and plates were stored at −80° C. until further use. Bravo liquid handler (Agilent Technologies) was used to make the platform high-throughput.

LC-MS/MS and Database Search for Biomarker Discovery

The samples are resuspended in 20 µl of 0.1% v/v formic acids for LC-MS/MS. Depending upon lectin used for pull-down, optimal amount of tryptic peptides were subjected to LC-MS using Agilent 6520 QTOF coupled with a Chip Cube and 1200 HPLC (9 µl were loaded for HAA, HPA and UEA, 6 µl for NPL, STL, GNL, 5 µl for BPL, DSA, ECA, MAA, SBA, WFA and WGA, 4 µl for AAL, SNA, LPHA, PSA and JAC, 1 µl for EPHA and ConA). The nano pump was set at 0.3 µl/min and the capillary pump at 4 µl/min. The HPLA-chip used contains 160 nl C18 trapping column, and 75 µm×150 mm 300 Å C18 analytical column (G4240-62010 Agilent Technologies). Buffer A was 0.1% v/v formic acid and Buffer B was 90% v/v acetonitrile containing 0.1% v/v formic acid. Peptides were eluted from the column using gradient from 6% B to 46% B at 45 minutes. Nano pump % B was increased to B at 45.5 min and maintained at the level till 55.5 min. It decreased to original 6% B at 58.5 minutes. The mass spectrometry was operated in 2 GHz extended dynamic range and programmed to acquire 8 precursor MS1 spectra per second and 4 MS/MS spectra for each MS spectra. Dynamic exclusion was applied after 2 MS/MS within 0.25 minutes. Exclusion for lectin peptides was applied. The QTOF was tuned and calibrated prior to the analysis. One hundred femtomole/µl of pre-digested bovine serum albumin peptides were used as quality control, before and after each plate. Levels of reference ions 299.2945 and 1221.9906 were maintained at minimum 5000 and 1000 counts respectively.

To account for experimental variations, 10 pmol chicken ovalbumin, a glycoprotein that binds to every lectin, was spiked in to each sample as internal standard so as to calculate a normalisation factor for each identified protein. LeMBA-MS/MS was then performed by first isolating serum glycoproteins using a lectin-magnetic bead array that included a panel of 20 lectins (shown in TABLE 9), then performing on-bead tryptic digestion of the glycoproteins followed by LC-MS/MS using an Agilent 6520 QTOF couple with a Chip CUBE and 1200 HPLC, as described by Choi et al. (Electrophoresis (2011) 32, 3564-3575). The resulting raw data file was processed with Spectrum Mill software for database searching against the SwissProt human database to identify the glycoproteins.

TABLE 8

DISCOVERY PHASE PATIENT SAMPLES

| Parameter | Condition | | |
|---|---|---|---|
| | Healthy (n = 9) | BE (n = 10) | EAC (n = 10) |
| Age in years (median ± SD) | 66 ± 10 | 62 ± 15 | 66 ± 8 |
| Cardiovascular complications | 5 | 3 | 3 |
| Type 2 diabetes | 1 | 0 | 1 |
| Gastritis | 1 | 1 | 1 |
| Peptic ulcer | 3 | 2 | 3 |
| Other malignancy | 1 | 2 | 2 |

TABLE 9

LECTINS USED IN LEMBA-MS

| Lectin Abbreviation | Lectin source | General reactivity | Known target(s) |
|---|---|---|---|
| BPL | *Bauhinia purpurea* lectin | α/β-D-Galactose | Galβ1-3GalNAc |
| ECA | *Erythrina cristagalli* agglutinin | α/β-D-Galactose | Galβ1-4GlcNAc |
| JAC | Jacalin | α/β-D-Galactose | Galα1-6GalNAc and Galβ1-3GalNAc |
| SBA | Soybean agglutinin | D-N-Acetylgalactosamine | GalNAcα1-3Gal |
| HPA | *Helix pomatia* agglutinin | D-N-Acetylgalactosamine | α-GalNAc |
| WFA | *Wisteria floribunda* agglutinin | D-N-Acetylgalactosamine | GalNAcα1-6Gal and GalNAcα1-3GalNAc |
| DSA | *Datura stramonium* lectin | D-N-Acetylglucosamine | β1-4GlcNAc oligomers |
| HAA | *Helix aspersa* agglutinin | D-N-Acetylglucosamine | α-GlcNAc and α-GalNAc |
| STL | *Solanum tuberosum* lectin | D-N-Acetylglucosamine | GlcNAcβ1-4GlcNAc oligomers |
| WGA | Wheat germ agglutinin | D-N-Acetylglucosamine | GlcNAcβ1-4GlcNAc and Neu5Ac |
| ConA | Concanavalin A | D-Mannose | α-Man, α-Glc, and α-GlcNAc |
| GNL | *Galanthus nivalis* lectin | D-Mannose | Manα1-3Man |
| NPL | *Narcissus pseudonarcissus* lectin | D-Mannose | Manα1-6Man |
| AAL | *Aleuria aurantia* lectin | α-L-Fucose | Fucα1-2, -3, -6 linked |
| PSA | *Pisum sativum* agglutinin | α-L-Fucose | Fucα1-6GlcNAc of N-linked glycans |
| UEA | *Ulex europeus* agglutinin-I | α-L-Fucose | Fucα1-2Galβ1-4GlcNAc |

TABLE 9-continued

LECTINS USED IN LEMBA-MS

| Lectin Abbreviation | Lectin source | General reactivity | Known target(s) |
|---|---|---|---|
| MAA | *Maackia amurensis* agglutinin-II | Sialic acid | Neu5Acα2-3Galβ1-3 linkages |
| SNA | *Sambucus nigra* agglutinin | Sialic acid | Neu5Acα2-6 linkages |
| E-PHA | Erythroagglutinating phytohemagglutinin | Complex specificities | Bisecting GlcNAc |
| L-PHA | Leukoagglutinating phytohemagglutinin | Complex specificities | Tri/tetra-antennary β1-6GlcNAc |

Figure 2:
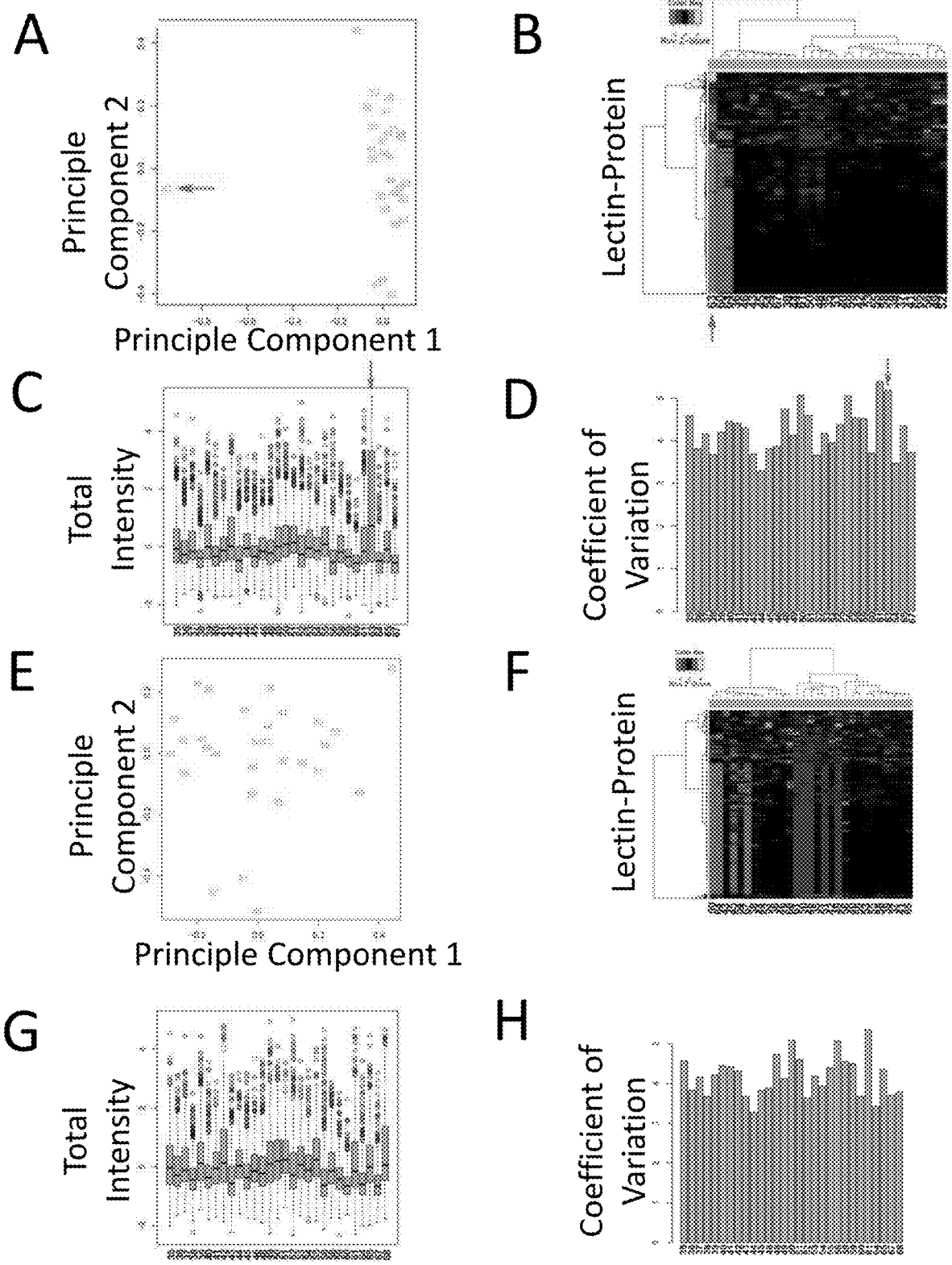
FIG. 2 demonstrates the outlier detection feature of GlycoSelector which allows the visualization of experimental errors or bias present in the data using four different graphical visualization tools. (A and E) Principal component analysis, (B and F) hierarchical clustering, (C and G) boxplot graphical outputs (wherein "total intensity" is normalized and scaled) and (D and H) barplots of the coefficient of variation for BE/EAC biomarker discovery screen. Unique numbers on the graph indicate the individual patient sample run. Run number 63 (arrow) in panel A to D was considered as an outlier based on the visualization tools. The sample was re-analyzed on the mass spectrometer and outlier detection was performed again (panel E to H).

The multi-dimensional data from the LeMBA-MS were stored in the GlycoSelector database as lectin-protein pairs with the measured total MS1 intensity for the proteins, and the corresponding internal standard file for the sample. GlycoSelector was then used to perform sample outlier detection (FIG. 2) and classification of the glycoproteins by pairwise comparison of the patient groups. Sparse partial least squares regression-discriminant analysis (sPLS-DA, Le Cao et al. (2011) BMC bioinformatics 12, 253) was used to select a ranked list of lectin-protein pairs that classified between 2 groups. As an example, the sPLS-DA plot in FIG. 3a shows clear separation of BE and EAC using the top 100 lectin-protein pairs. Out of the top 100 lectin-protein pairs, 82 candidates passed the stability cut-off of 0.6 (FIG. 3b). There was considerable overlap between lectin protein candidates identified between healthy vs. BE, BE vs. EAC and healthy vs. EAC patient groups (FIG. 3c). Each of the 20 lectins used for biomarker discovery showed differential binding with at least one candidate (FIG. 3d). For orthogonal verification of the LeMBA-MS screen by immunoblotting, we chose two candidates with available antibodies, which showed altered binding to AAL lectin. AAL-haptoglobin was one of the top ranked stable candidate in sPLS-DA analysis between healthy vs. EAC and BE vs. EAC while AAL-gelsolin was identified using group binding difference feature of GlycoSelector as on-off change between BE vs. EAC and healthy vs. EAC. Using the same set of discovery serum samples, we performed AAL lectin pull-down, and measured haptoglobin and gelsolin binding by immunoblotting. A control serum sample was loaded on every blot as a normaliser between membranes. Protein level verification by immunobloting confirmed the MS/MS results (FIG. 3e, 30, but showed higher sensitivity by detecting low levels of gelsolin in all the patient samples, when some were undetectable by MS/MS.

To feasibly verify a list of candidates identified in biomarker discovery screen in an independent cohort of samples (20 healthy, 21 BE, 20 EAC, with all groups having a median age of between 60 and 64 years), multiplexed MRM-MS was optimized for 41 target protein candidates and LeMBA was performed using 6 lectins (AAL, EPHA, JAC, NPL, PSA and WGA). Linearity of the MRM method was determined by spiking range of dilutions of stable isotope standard (SIS) peptide, spanning 3125 fold dilution range into constant amount of LeMBA pull-down sample. The amount of SIS peptide spiked-in for each of four peptides was adjusted in such a manner that response from 1× labeled peptide mix fall within 5-fold range of the cognate natural peptide. The reproducibility of the dynamic MRM method was determined by running the same sample in triplicate for four consecutive days. Analysis showed that 86% of the peptides in MRM method showed % CV below 10% while 9% of peptides showed % CV between 10-20% and only 5% of the peptides were above 20%. Furthermore, % CV for the entire MRM-MS analysis for SIS as well as natural internal standard chicken ovalbumin peptide was below 20% suggesting robust performance of the LeMBA-MRM-MS method. To account for any variation during LeMBA pull-down and mass spectrometric measurements, we utilized two normalization procedures. Firstly, natural ovalbumin peptide intensity was normalized by spiked-in SIS ovalbumin peptide. Secondly, the intensity of all measured peptides of target proteins was normalized using normalized intensity of natural ovalbumin peptide. Univariate statistical analysis using Kruskal-Wallis tests was performed to assess statistical significance of each of the candidates. Area under Receiver Operating Characteristic (AUROC) was calculated to measure the diagnostic potential of each marker and comparison was made between healthy vs. BE, BE vs. EAC and healthy vs. EAC phenotypes (see, TABLE 12).

Results

Out of total 246 lectin-protein candidates quantified, 148 candidates showed p-value less than 0.05.

TABLE 10 shows the relative increase or decrease of exemplary differentially glycosylated proteins in the serum of patients with EAC compared to healthy patients, BE compared to healthy patients, and in the serum of patients with EAC compared to patients with BE, i.e. the relative abundance of the specific glycospecies. For example, eight proteins (P00751: complement factor B, P01011: alpha-1-antichymotrypsin, P01031: complement C5, P02748: complement component C9, P02790: hemopexin, P04003: C4b-binding protein alpha chain, P05155: plasma protease C1 inhibitor, P05546: heparin cofactor 2) having glycans that facilitated binding to JAC (i.e. the JAC-binding glycospecies of complement factor B, the JAC-binding glycospecies of alpha-1-antichymotrypsin, the JAC-binding glycospecies of complement C5, the JAC-binding glycospecies of complement component C9, the JAC-binding glycospecies hemopexin, the JAC-binding glycospecies of C4b-binding protein alpha chain and the JAC-binding glycospecies of plasma protease C1 inhibitor, and the JAC-binding glycospecies of heparin cofactor 2) were increased in the serum of patients with EAC compared to healthy patients.

TABLE 10

RELATIVE ABUNDANCE OF GLYCOSPECIES

| Lectin (glycan) | Proteins (by SwissProt Acc. No.) | | |
|---|---|---|---|
| | EAC vs HC | BE vs HC | EAC vs BE |
| AAL (Fuc α1,2,3,6 linked) | ↑ P02748 ↓ P06396 | | ↑ P00738, P01031, P02748, P10643 ↓ P04114, P06396 |
| PSA (Fuc α1-6GlcNAc) | ↑ P00738, P02748 ↓ P06396 | | ↑ P00738, P01011, P02748, P01031, P10643 ↓ P06396 |
| EPHA (Bisecting GlcNAc) | ↑ P00738, P02748 ↓ P01023, P02765, P06396 | ↑ P01023 | ↑ P00738, P01011, P02748, P02787, P10643 ↓ P06396 |
| JAC (Galα1-6GalNAc, Galβ1-3GalNac) | ↑ P00751, P01011, P01031, P02748, P02790, P04003, P05155, P05546 ↓ P06396 | ↑ P04114 | ↑ P00738, P00751, P01009, P01011, P01031, P02748, P04217, P10643 ↓ P06396 |
| NPL (Mannose α1-3Man) | ↑ P00738, P01011, P02748, P04003 | ↑ P04114 | ↑ P02748 ↓ P04114, P06396, P43652 |
| WGA (GlcNAcβ1-4GlcNAc and Neu5Ac) | ↑ P00738, P02748, P01011 | | ↑ P00738, P02748 ↓ P06396 |

Figure 3:
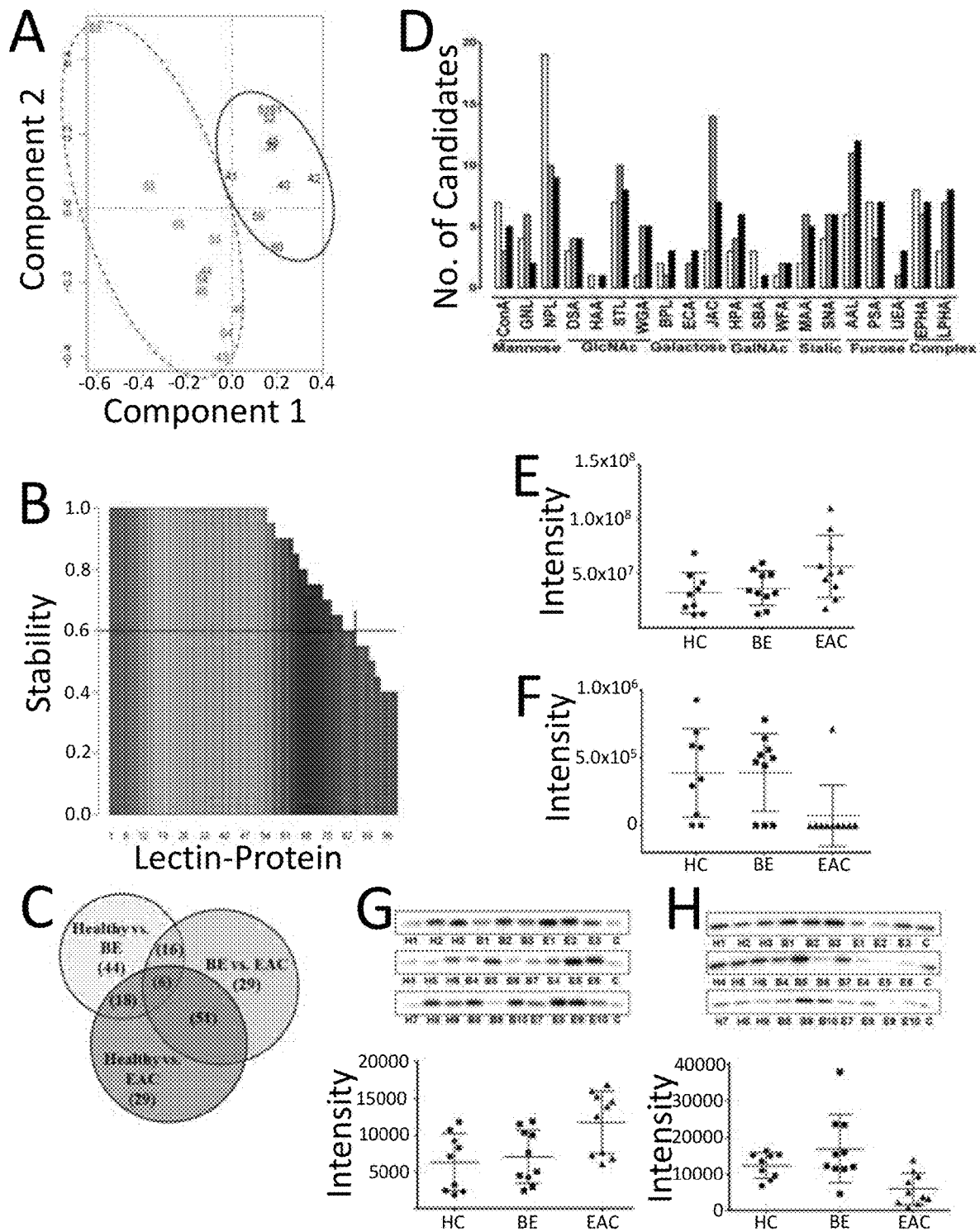
FIG. 3 shows biomarker discovery and orthogonal verification. Serum samples from 29 patients (healthy-9, BE-10 and EAC-10) were screened using LeMBA-GlycoSelector pipeline. (A) sPLS-DA clustering: The sPLS-DA sample representation is based on the top 100 lectin-protein candidates that differentiates EAC (left group on graph) from BE (right group on graph). (B) Stability analysis: Amongst the top 100 sPLS-DA candidates, 82 candidates passed the stability criteria cut-off of 0.6 using 10-fold cross-validation analysis repeated 1000 times. (C) Overlap between lectin-protein candidates that differentiates BE from healthy, EAC from BE and EAC from healthy phenotype. (D) Number of unique candidate proteins identified for each lectin in LeMBA-GlycoSelector analysis. Each of 20 lectins used for screening identified at least one unique protein candidate. (Clear bars—candidates differently expressed between HC and BE; grey bars: candidates differently expressed between BE and EAC; black bars: candidates differently expressed between HC and EAC). (E and F) Label-free proteomics relative quantitation results for AAL-HP and AAL-GSN, respectively. (E) AAL-HP (AAL-P00738) and (F) AAL-GSN (AAL-P06396) were the top two candidates identified using sPLS-DA and group binding difference tool respectively. (G and H) Normalized intensity for AAL-HP and AAL-GSN using immunoblotting (H: healthy; B: BE; E: EAC; and C: control).
Figure 4:
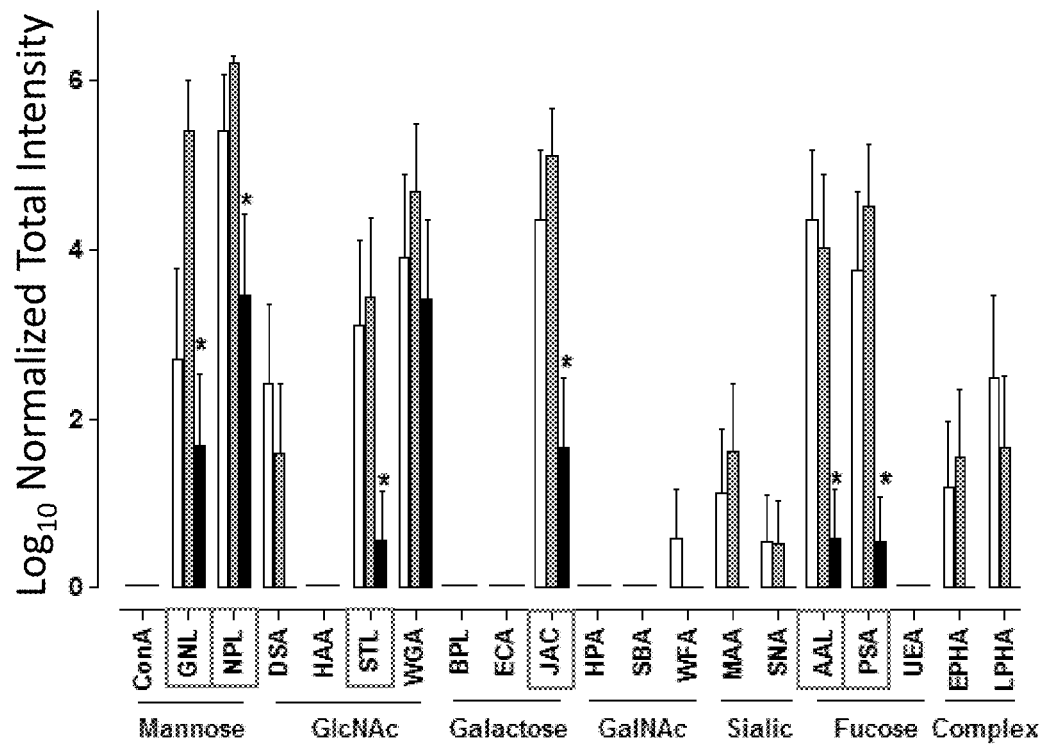
FIG. 4 shows LeMBA-MS data for Gelsolin as an example. Y-axis shows relative abundance (note the log scale). X-axis shows the binding to each of the 20 lectins, grouped into general reactivity groups. Boxed lectins show statistically significantly different binding between BE and EAC groups (* p<0.05, Student's t-test). (Clear bars: HC; grey bars: BE; black bars: EAC).

FIG. 4 shows the relative abundance of exemplary glycospecies that were demonstrated to be significantly increased or decreased in at least two of EAC, BE and healthy subjects, and which could thus be used to distinguish between healthy, pre-cancer (BE) patients and EAC patients, and therefore determine the likelihood of the presence or absence of EAC. For example, the AAL-binding gelsolin (P06396) and PSA-binding gelsolin glycospecies were present in the serum of EAC patients at significantly reduced levels compared to the serum of BE patients. Conversely, the AAL-binding complement component C9 (P02748), AAL-binding complement component C9, and EPHA-binding haptoglobin (P00738) glycospecies were present in the serum of EAC patients at significantly increased levels compared to the serum of BE patients. FIG. 3 show the relative abundance of exemplary glycospecies that were demonstrated to have a statistically significant increase or decrease in amount (as assessed using an ANOVA-Tukey test) in the serum of BE patients compared to healthy patients, and which could thus be used to distinguish healthy patients from pre-cancer patients with EAC.

FIG. 4 shows LeMBA-MS data for gelsolin. Specifically, the Y-axis shows relative abundance (note the log scale), and the X-axis shows the binding to each of the 20 lectins, grouped into general reactivity groups. Boxed lectins show statistically significantly different binding between BE and EAC groups (* p<0.05, Student's t-test). The graph clearly shows that the gelsolin glycospecies that most clearly distinguish between BE and EAC based on their relative abundance, and in particular NPL-binding gelsolin, JAC-binding gelsolin, PSA-binding gelsolin and GNL-binding gelsolin, which are significantly reduced in the serum of EAC patients compared to BE patients, suggesting a reduction in multiple glycan structures on gelsolin in EAC patients.

Example 2

Detecting Combinations of Glycospecies

In order to determine whether a particularly robust set of markers could selected in order to improve the determination of the likelihood of the presence or absence of BE or EAC in a subject, combinations of glycospecies identified from the relevant table (TABLES 1, 4, and 6) were analysed.

It was found that the power of the diagnostic test could be enhanced by measuring a panel of two, three, four, five, or more than five markers (see, TABLE 11). Notably, when using four glycospecies (JAC-binding complement component C9, EPHA-binding alpha-1B-glycoprotein, EPHA-binding gelsolin, WGA-binding angiotensin and alpha-2-macroglobulin) are measured between subjects with EAC and healthy controls, an AUC of up to 98.25% can be achieved.

TABLE 11

| Glycospecies (EAC v Healthy) | | | | | AUC |
|---|---|---|---|---|---|
| P02748_JAC | | | | | 0.775 |
| P02748_JAC | P04217_EPHA | | | | 0.86 |
| P02748_JAC | P04217_EPHA | P06396_EPHA | | | 0.93 |
| P02748_JAC | P04217_EPHA | P06396_EPHA | P01019_WGA | | 0.9825 |
| P02748_JAC | P04217_EPHA | P06396_EPHA | P01019_WGA | P01023_NPL | 0.98 |
| P02748_JAC | | | | | 0.775 |
| P02748_JAC | P06396_EPHA | | | | 0.8475 |
| P02748_JAC | P06396_EPHA | P02748_WGA | | | 0.8525 |

TABLE 11-continued

| | | | | | AUC |
|---|---|---|---|---|---|
| P02748_JAC | P06396_EPHA | P02748_WGA | P02748_NPL | | 0.8525 |
| P02748_JAC | P06396_EPHA | P02748_WGA | P02748_NPL | P06396_SNA | 0.86 |

Glycospecies (EAC v BE)

| | | | | | |
|---|---|---|---|---|---|
| P02748_AAL | | | | | 0.8525 |
| P02748_AAL | P02748_JAC | | | | 0.835 |
| P02748_AAL | P02748_JAC | P02748_PSA | | | 0.8375 |
| P02748_AAL | P02748_JAC | P02748_PSA | P02748_EPHA | | 0.8425 |
| P02748_AAL | P02748_JAC | P02748_PSA | P02748_EPHA | P02748_WGA | 0.8375 |
| P02748_AAL | | | | | 0.8525 |
| P02748_AAL | P04114_NPL | | | | 0.91 |
| P02748_AAL | P04114_NPL | P04217_EPHA | | | 0.9625 |
| P02748_AAL | P04114_NPL | P04217_EPHA | P01781_PSA | | 0.975 |
| P02748_AAL | P04114_NPL | P04217_EPHA | P01781_PSA | P0C0L5_WGA | 0.985 |

TABLE 12

DIFFERENTIAL EXPRESSION OF GLYCOSPECIES

| Glycospecies (Lectin-SwissProt No) | Kruskal-Wallis p-value | AUROC |
|---|---|---|
| BE vs EAC | | |
| AAL_P00738 | 0.0398 | 0.69 |
| EPH_P00738 | 0.0200 | 0.715 |
| JAC_P00738 | 0.0483 | 0.6825 |
| PSA_P00738 | 0.0483 | 0.6825 |
| WGA_P00738 | 0.0483 | 0.6825 |
| JAC_P00751 | 0.0398 | 0.69 |
| JAC_P01009 | 0.0453 | 0.685 |
| EPH_P01011 | 0.0265 | 0.705 |
| JAC_P01011 | 0.0102 | 0.705 |
| PSA_P01011 | 0.0425 | 0.6875 |
| AAL_P01031 | 0.0483 | 0.6825 |
| JAC_P01031 | 0.0398 | 0.69 |
| PSA_P01031 | 0.0453 | 0.685 |
| AAL_P02748 | 0.0001 | 0.8525 |
| EPH_P02748 | 0.0003 | 0.8375 |
| JAC_P02748 | 0.0007 | 0.8125 |
| NPL_P02748 | 0.0049 | 0.76 |
| PSA_P02748 | 0.0008 | 0.81 |
| WGA_P02748 | 0.0032 | 0.7725 |
| EPH_P02787 | 0.0326 | 0.6975 |
| AAL_P04114 | 0.0483 | 0.6825 |
| NPL_P04114 | 0.0248 | 0.7075 |
| JAC_P04217 | 0.0483 | 0.6825 |
| AAL_P06396 | 0.0087 | 0.7425 |
| EPH_P06396 | 0.0186 | 0.7175 |
| JAC_P06396 | 0.0305 | 0.7 |
| NPL_P06396 | 0.0173 | 0.72 |
| PSA_P06396 | 0.0483 | 0.6825 |
| WGA_P06396 | 0.0128 | 0.73 |
| AAL_P10643 | 0.0063 | 0.7525 |
| EPH_P10643 | 0.0398 | 0.69 |
| JAC_P10643 | 0.0094 | 0.74 |
| PSA_P10643 | 0.0019 | 0.7875 |
| NPL_P43652 | 0.0483 | 0.6825 |
| EAC vs HC | | |
| AAL_P00738 | 0.0583 | 0.675 |
| EPH_P00738 | 0.0305 | 0.7 |
| NPL_P00738 | 0.0349 | 0.695 |
| PSA_P00738 | 0.0425 | 0.6875 |
| WGA_P00738 | 0.0215 | 0.7125 |
| JAC_P00751 | 0.0373 | 0.6925 |
| JAC_P01011 | 0.0305 | 0.7 |
| NPL_P01011 | 0.0305 | 0.7 |
| WGA_P01011 | 0.0080 | 0.745 |
| EPH_P01023 | 0.0186 | 0.7175 |
| JAC_P01031 | 0.0483 | 0.6825 |
| AAL_P02748 | 0.0161 | 0.7225 |
| EPH_P02748 | 0.0265 | 0.705 |
| JAC_P02748 | 0.0029 | 0.775 |
| NPL_P02748 | 0.0074 | 0.7475 |
| PSA_P02748 | 0.0161 | 0.7225 |
| WGA_P02748 | 0.0049 | 0.76 |
| EPH_P02765 | 0.0483 | 0.6825 |
| JAC_P02790 | 0.0200 | 0.715 |
| JAC_P04003 | 0.0138 | 0.7275 |
| JAC_P05155 | 0.0200 | 0.715 |
| JAC_P05546 | 0.0483 | 0.6825 |
| AAL_P06396 | 0.0265 | 0.705 |
| EPH_P06396 | 0.0014 | 0.795 |
| JAC_P06396 | 0.0200 | 0.715 |
| PSA_P06396 | 0.0110 | 0.735 |
| BE vc HC | | |
| EPH_P01023 | 0.0248 | 0.7075 |
| JAC_P04114 | 0.0305 | 0.7 |
| NPL_P04114 | 0.0215 | 0.7125 |

While some gelsolin glycospecies were present at similar levels in the serum of healthy, BE and EAC patients (e.g. WGA-binding gelsolin), others were present at statistically different levels in the various groups. For example, glycospecies characterised as being in the serum of EAC patients at significantly reduced amounts compared to BE patients (statistical analysis using the Student's t-test), but were not present in significantly different amounts between healthy and BE patients. These results indicated that there was a reduction in many different glycan structures, including various glycans containing D-Mannose, D-N-Acetylglucosamine, α/β-D-Galactose and α-L-Fucose, in plasma gelsolin proteins of EAC patients compared to BE patients.

Figure 5:
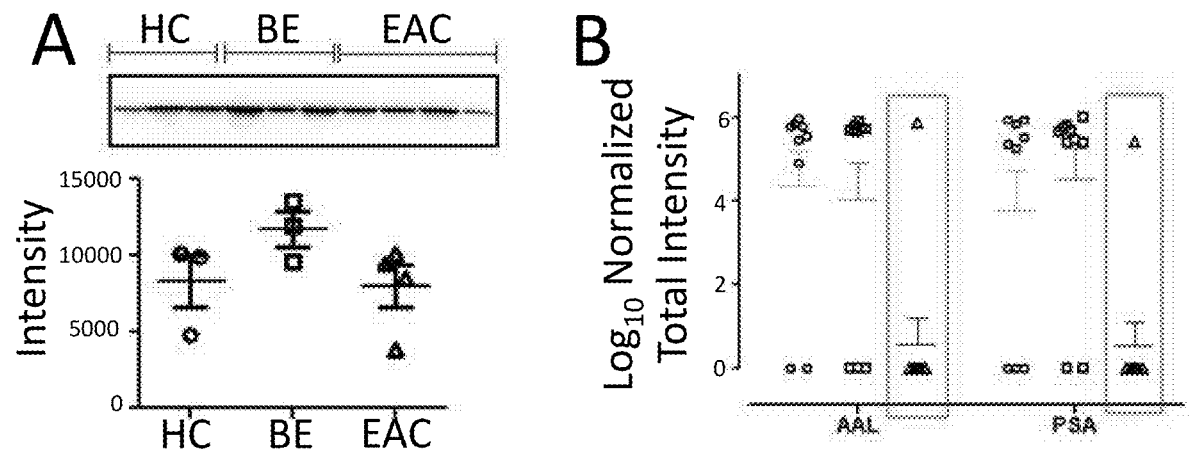
FIG. 5 shows a reduction of fucosylated gelsolin in EAC. (A) Immunoblot showing similar total serum gelsolin levels. (B) Individual data for the two fucose-reactive lectins with reduced gelsolin binding in EAC. (Circle plots: HC; square plots: BE; triangle plots: EAC).

To exclude the possibility that loss of glycosylated gelsolin in EAC was due to an overall loss of gelsolin protein in the serum, immunoblotting with an anti-gelsolin antibody was performed to measure the level to total gelsolin in some of the serum samples. As shown in FIG. 5, there was a non-significant trend towards an increased level of gelsolin in the serum of BE patients compared to healthy and EAC patients, while the amount of AAL-binding and PSA-binding gelsolin was significantly reduced in EAC patients compared to healthy patients (as indicated by gelsolin binding to the two fucose-reactive lectins, AAL and PSA).

Example 3

Validation of Glycospecies Biomarkers

In order to demonstrate that glycospecies biomarkers can be reliably determine the likelihood of a subject having a relevant condition, a number of the biomarkers were selected for validation in a separate and distinct cohort of subjects.

TABLE 13 shows the relative increase or decrease of exemplary differentially glycosylated proteins in the serum of patients with EAC compared to healthy patients, BE compared to healthy patients, and in the serum of patients with EAC compared to patients with BE, i.e. the relative abundance of the specific glycospecies. For example, six proteins (P00738: haptoglobin, P00751: complement factor B, P01011: alpha-1-antichymotrypsin, P02748: complement component C9, P09871: complement C1s subcomponent, and P10643: complement component C7) having glycans that facilitated binding to EPHA (i.e. the EPHA-binding glycospecies of haptoglobin, the EPHA-binding glycospecies of complement factor B, the EPHA-binding glycospecies of alpha-1-antichymotrypsin, the JAC-binding glycospecies of complement component C9, the EPHA-binding glycospecies complement C1s subcomponent, and the EPHA-binding glycospecies of complement component C7) were increased in the serum of patients with EAC compared to healthy patients

Materials and Methods

Study Design and Sample Information

Serum samples were collected from consenting patients undergoing upper gastrointestinal at Ochsner Health Systems, New Orleans, USA. The study was approved by the Human Research Ethics Committees of Ochsner Health Systems and the University of Queensland. Patient diagnosis was according to current practice, endoscopy with histology of biopsy samples, and classified as BE (Barrett's esophagus), EAC (esophageal adenocarcinoma) or healthy (i.e., non-BE/EAC). TABLE 14 describes the clinical characteristics of patients. Samples were randomized prior to all experiments. The samples were stored at −80° C. until use.

TABLE 14

| Variables | BE | EAC | HC |
|---|---|---|---|
| Sample size | 12 | 10 | 16 |
| Gender (% Male) | 83% | 80% | 75% |
| Age (Median ± SD) | 71 ± 10 | 63 ± 10 | 66 ± 11 |
| Body mass index | | | |
| Healthy (<25) | 7 | 2 | 2 |
| Overweight (25-30) | 2 | 5 | 4 |
| Obese (>=30) | 3 | 3 | 10 |

Materials and Methods

MyOne™ Tosyl activated Dynabeads were from Life Technologies. Lectins AAL, EPHA, JAC, and NPL were

TABLE 13

| Lectin (glycan) | Proteins (by SwissProt Acc. No.) | | |
|---|---|---|---|
| | EAC vs HC | BE vs HC | EAC vs BE |
| AAL (Fuc α1,2,3,6 linked) | ↑ P01009; P01011; P02748; P04217; P09871; P10643; P19652 <br> ↓ P02679; P02753; P06396; P07225; P35858; P43652; Q96PD5 | ↑ P51884 | ↑ P02748, P00734 <br> ↓ P02753 |
| EPHA (Bisecting GlcNAc) | ↑ P00738; P00751; P01011; P02748; P09871; P10643 <br> ↓ P02679; P02765; P06396; P33151; P68871; Q96PD5 | ↑ P51884 <br> ↓ P00734; P02751; | ↑ P00751, P02748 <br> ↓ P02749, P06396, P51884, Q15166 |
| JAC (Galα1-6GalNAc, Galβ1-3GalNac) | ↑ P00738; P01009; P01011; P02748, P05155, P09871 <br> ↓ P02647; P02675; P02679; P02753; P02765; P02787; P06396; P07225; P03952; P06396; P07225; P29622; P33151; P35858; P68871; Q7Z7A1; Q96PD5 | ↓ O95445; P00734; P01019; P02647; P02675; P03952; P04114; P04196; P07225; P07357; P08603; P08697; P29622; P43652; P68871 | ↑ P00450, P00734; P01011, , P02748, P02790, P04217, P05155, P05156, P08603, P09871, P20851, Q14624 |
| NPL (Mannose α1-3Man) | ↑ P00738, P01009; P01011, P02748, P02790; P04217 <br> ↓ P02647; P02765; P02787, P06396; P07225; P27169; P33151; P35858; P43652; P68871; Q15166; Q96PD5 | ↑ P02749 <br> ↓ P04114; P08697; P33151; P68871 | ↑ P02748 <br> ↓ P06396 | from Vector Laboratories. Modified sequencing grade trypsin was from Promega. Triton X-100 and sodium dodecyl sulfate solution were from Bio-rad. Tris base, glycine, and sodium chloride were from Amresco. Disodium hydrogen phosphate dihydrate, sodium dihydrogen phosphate dihydrate, and calcium chloride dihydrate were from Ajax Finechem. Manganese chloride was from Univar. Acetonitrile CHROMASOLV® gradient grade was from Sigma. All other reagents including lectins not listed above were from Sigma unless otherwise specified.

Methodologies

Serum samples were screened using LeMBA-MRM-MS assay with four lectins (AAL, EPHA, JAC, and NPL) as reported previously in Shah et al. 2015 Mol. Cell. Proteomics 14, 3023-3039.

Lectin Magnetic Bead Array (LeMBA)

Lectins were conjugated with magnetic beads as described previously in Shah et al. Mol. Cell. Proteomics 14, 3023-3039. (2, 3). For each pull down experiment, lectin-beads (AAL, EPHA, JAC, and NPL) were arrayed in each well of a 96 well plate. Serum samples (allowing 50 ug per pull-down as measured by BCA protein assay) were spiked with 10 pmol ovalbumin per reaction as an internal standard. The serum protein mixture was denatured and reduced using denaturing buffer (20 mM Tris-HCl pH 7.4, 1% w/v SDS, 5% v/v Triton X-100 and 20 mM Dithiothreitol) at 60° C. for 30 min followed by alkylation with 100 mM iodoacetamide for 1 hr at 37° C. in the dark. Alkylated serum sample (50 µg per reaction) was incubated with lectin conjugated beads in 100 µl binding buffer (20 mM Tris-HCl pH 7.4, 300 mM NaCl, 1 mM $CaCl_2$, 1 mM $MnCl_2$, 0.05% w/v SDS, 1% v/v Triton X-100) at 4° C. for 1 hr on a plate shaker to allow glycoprotein-lectin binding. Beads were then washed sequentially with (i) binding buffer 3 times and (ii) 50 mM ammonium bicarbonate seven times, including three plate changes in-between washes. For on-bead trypsin digest, 0.95 µg of sequencing grade trypsin in 20 µl of 50 mM ammonium bicarbonate was added to each reaction mixture and incubated at 37° C. overnight. The next day, digested peptides were transferred to a new plate. Beads were washed with an equivalent volume of 50 mM ammonium bicarbonate, and the supernatant was combined with digested peptides. Peptide samples were vacuum-dried and the plates were stored at −80° C. until further use. Bravo liquid handler (Agilent Technologies) was used to make the platform high throughput.

MRM-MS

Multiple reaction monitoring-mass spectrometry (MRM-MS) assay was performed on Agilent Technologies 6490 triple quadrupole mass spectrometer coupled with 1290 standard-flow infinity UHPLC fitted with a standard-flow ESI (Jet Stream) source. A customized MRM-MS assay for 114 target proteins was developed and used to measure four lectin pull-downs (AAL, EPHA, JAC, and NPL) for each patient sample independently. Detail strategy for MRM-MS assay development was described in Shah et al. 2015 Mol. Cell. Proteomics 14, 3023-3039.

LC Method Development

The UHPLC system consisted of a reverse phase chromatographic column AdvanceBio Peptide Mapping (150× 2.1 mm i.d., 2.7 µm, part number 653750-902, Agilent Technologies) with a 5 mm long guard column. Mobile phase A consisted of 0.1% formic acid, and mobile phase B consisted of 100% acetonitrile and 0.1% formic acid. The UHPLC system was operated at 60° C., with a flow rate of 0.4 mL/min. The gradient used for peptide separation was as follows: 3% B at 0 min; 35% B at 40 min; 95% B at 40.50 min; 95% B at 44.50 min; 3% B at 45 min; followed by conditioning of columns for 4 min at 3% B before injecting the next sample.

Mass Spectrometer Settings

Agilent 6490 triple quadrupole mass spectrometer was operated in positive ion mode and controlled by Agilent's MassHunter Workstation software (version B.06.00 build 6.0.6025.4 SP4). The MRM acquisition parameters were 150 V high pressure RF, 60 V low pressure RF, 4000 V capillary voltage, 300 V nozzle voltage, 11 L/min sheath gas flow at a temperature of 250° C., 15 L/min drying gas flow at a temperature of 250° C., 30 psi nebulizer gas flow, unit resolution (0.7 Da full width at half maximum in the first quadrupole (Q1) and the third quadrupole (Q3), and 200 V delta EMV (+).

Screening Samples for LeMBA-MRM-MS Qualification

Lectin-beads sufficient for biomarker qualification experiments were made in a single batch to minimize experimental variation. Serum samples were randomized for LeMBA-MRM-MS experiments. Peptide samples were spiked with SIS peptide mixture containing 50 femtomole of SPAFTDLHLR, AVEVLPK, and LTPLYELVK each, 100 femtomole of LSPIYNLVPVK, 200 femtomole of NLAVSQVVHK, 500 femtomole of VASMASEK, ISQAVHAAHAEINEAGR, and GSFEFPVGDAVSK each, and 1000 femtomole of VTSIQDWVQK, and LPPNVVEESAR each.

Data Processing and Statistical Analysis

Raw data from MRM-MS experiment was processed using Skyline. All peaks were manually checked for correct integration, and peak area for each peptide (sum of all transitions) was exported for further analysis. Firstly, raw peptide intensity were normalized according to SIS peptide mixture. Followed by the two step normalization described in Shah et al. 2015 *Mol. Cell. Proteomics* 14, 3023-3039. Univariate, multivariate and ROC curve analyses were performed using Shiny mixOmics (available on the world wide web at mixomics-projects.di.uq.edu.au/Shiny-dev/) as described in Shah et al. 2015 *Mol. Cell. Proteomics* 14, 3023-3039.

Example 4

Detecting Additional Combinations of Glycospecies Biomarkers

In order to determine whether an additional robust set of markers could selected in order to assist with or improve the determination of the likelihood of the presence or absence of BE or EAC in a subject, combinations of glycospecies identified from the relevant table (TABLES 3, 5 and 7) were analysed.

Figure 6:
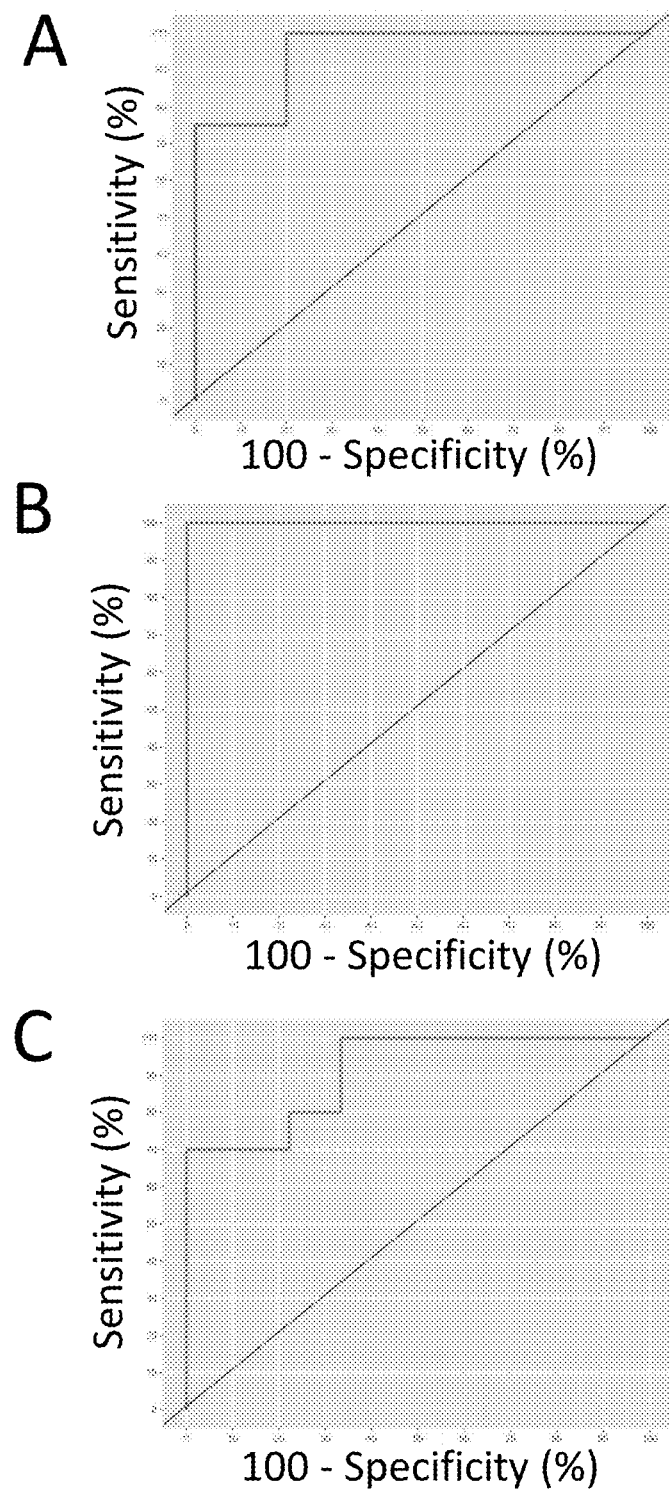
FIG. 6 provides proof—of concept data of exemplary glycospecies marker panels. (A) ROC curve of multimarker panel for BE vs EAC; (B) ROC curve of multimarker panel for HC vs EAC; and (C) ROC curve of multimarker panel for HC vs BE.

It was found that the power of the diagnostic test could be enhanced by measuring a panel of two or more markers. Notably, when seven glycospecies are measured between subjects with EAC and subjects with BE, an AUC of up to 95% can be achieved (see, TABLE 15; and FIG. 6).

TABLE 15

| Comparison | Glycospecies Biomarkers | AUROC |
| --- | --- | --- |
| BE vs EAC | (1) P00734_AAL; (2) P02748_JAC; (3) P02748_EPH (4) P06396_NPL; (5) P00734_JAC; (6) P00450_JAC; (7) P02748_NPL | 0.9500 |

TABLE 15-continued

| Comparison | Glycospecies Biomarkers | AUROC |
|---|---|---|
| HC vs EAC | (1) P01011_JAC; (2) P02748_EPH; (3) P01011_NPL; (4) P02748_JAC; (5) P01011_EPH; (6) P01011_AAL; (7) P02748_NPL; (8) P09871_EPH; (9) P02748_AAL; (10) P10643_EPH; (11) Q96PD5_NPL | 1.000 |
| HC vs BE | (1) P51884-AAL; (2) P51884-EPH | 0.9111 |

The disclosure of every patent, patent application, and publication cited herein is hereby incorporated herein by reference in its entirety.

The citation of any reference herein should not be construed as an admission that such reference is available as "Prior Art" to the instant application.

Throughout the specification the aim has been to describe the preferred embodiments of the invention without limiting the invention to any one embodiment or specific collection of features. Those of skill in the art will therefore appreciate that, in light of the instant disclosure, various modifications and changes can be made in the particular embodiments exemplified without departing from the scope of the present invention. All such modifications and changes are intended to be included within the scope of the appended claims.

What is claimed is:

1. A method for treating a subject who has esophageal adenocarcinoma (EAC) or Barrett's esophagus (BE), the method comprising:
    (a) contacting a sample from the subject with a glycan-binding molecule specific for at least one glycospecies of at least one glycoprotein under conditions that permit binding of the glycan-binding molecule to the at least one glycospecies, wherein the glycan-binding molecule comprises jacalin (JAC) and the at least one glycoprotein comprises alpha-1-antitrypsin;
    (b) determining a level of the at least one glycospecies of the at least one glycoprotein bound to the glycan binding molecule, wherein the at least one glycospecies is differentially expressed between EAC and BE;
    (c) determining the subject as having EAC or BE based on whether the level of the at least one glycospecies of the at least one glycoprotein bound to the glycan binding molecule a predetermined threshold that correlates with EAC or BE; and
    (d)(1) where the subject is determined to have EAC, administering to the subject a treatment selected from the group consisting of: esophagectomy, chemotherapy, immunotherapy, and radiation therapy; and (2) where the subject is determined to have BE, administering to the subject a treatment selected from the group consisting of: a diet and exercise regimen, a therapeutic agent to reduce acid reflux, photodynamic therapy (PDT), and endoscopic mucosal resection (EMR).

2. The method of claim 1, wherein the at least one glycoprotein further comprises at least one glycoprotein selected from the group consisting of: alpha-1-antichymotrypsin, complement component C9, haptoglobin, complement factor B, complement C5, alpha-1B-glycoprotein, complement component C7, and gelsolin.

3. The method of claim 1, wherein the at least one glycoprotein further comprises at least one glycoprotein selected from the group consisting of: afamin, alpha-1-antichymotrypsin, complement component C9, plasma kallikrein, alpha-1B-glycoprotein, alpha-2-HS-glycoprotein, alpha-2-macroglobulin, apolipoprotein B-100, beta-2-glycoprotein 1, C4b-binding protein alpha chain, complement CS, complement component C7, complement factor B, gelsolin, haptoglobin, hemopexin, plasma protease C1 inhibitor, serum paraoxonase/arylesterase 1, and serotransferrin.

4. The method of claim 1, wherein the at least one glycospecies is two glycospecies.

5. The method of claim 1, wherein the at least one glycospecies is three glycospecies.

6. The method of claim 1, wherein the at least one glycospecies is four glycospecies.

7. The method of claim 1, wherein the at least one glycospecies is five or more glycospecies.

8. The method of claim 1, wherein step (b) comprises the use of spectrometry.

9. The method of claim 8, wherein the spectrometry comprises multiple reaction monitoring.

10. The method of claim 1, further comprising normalizing the level of the at least one glycospecies of the at least one glycoprotein bound to the glycan binding molecule using an exogenous glycoprotein.

11. The method of claim 10, wherein the amount of the predetermined exogenous glycoprotein comprises Galα1-6GalNAc or Galβ1-3GalNAc.

12. The method of claim 10, wherein the exogenous glycoprotein is ovalbumin.

13. The method of claim 1, wherein, where the subject is determined to have EAC, the subject is administered an alkylating agent, an antimetabolite, a taxoid, a growth factor receptor antibody, an angiogenic agent, or a cytokine.

14. The method of claim 1, wherein, where the subject is determined to have BE, the subject is administered a proton pump inhibitor, an antacid, or an H2 blocker.

15. A method for treating a subject who has esophageal adenocarcinoma (EAC) or Barrett's esophagus (BE), the method comprising:
    (a) contacting a sample from the subject with jacalin (JAC) to bind any alpha-1-antirypsin present in the sample;
    (b) determining the level of alpha-1-antirypsin from the amount bound by JAC;
    (c) determining the subject as having EAC where the level of alpha-1-antirypsin is characteristic of EAC and identifying the subject as having BE where the level of alpha-1-antirypsin is characteristic of BE; and
    (d)(1) where the subject is determined to have EAC, administering to the subject a treatment selected from the group consisting of: esophagectomy, chemotherapy, immunotherapy, and radiation therapy; and (2) where the subject is determined to have BE, administering to the subject a treatment selected from the group consisting of: a diet and exercise regimen, a therapeutic agent to reduce acid reflux, photodynamic therapy (PDT), and endoscopic mucosal resection (EMR).

* * * * *